United States Patent
Feng

(10) Patent No.: US 9,977,776 B2
(45) Date of Patent: May 22, 2018

(54) INPUT SUPPORT APPARATUS, INFORMATION PROCESSING SYSTEM, METHOD, AND STORAGE MEDIUM

(71) Applicant: FUJITSU LIMITED, Kawasaki-shi, Kanagawa (JP)

(72) Inventor: Lingyan Feng, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 94 days.

(21) Appl. No.: 14/727,103

(22) Filed: Jun. 1, 2015

(65) Prior Publication Data

US 2016/0011774 A1 Jan. 14, 2016

(30) Foreign Application Priority Data

Jul. 8, 2014 (JP) ................. 2014-140630

(51) Int. Cl.
| | | |
|---|---|---|
| G06F 3/0488 | (2013.01) | |
| G06F 17/27 | (2006.01) | |
| G06F 3/14 | (2006.01) | |

(52) U.S. Cl.
CPC .............. G06F 17/276 (2013.01); G06F 3/14 (2013.01)

(58) Field of Classification Search
USPC ........................................................ 345/168
See application file for complete search history.

(56) References Cited

U.S. PATENT DOCUMENTS

| | | | | |
|---|---|---|---|---|
| 2007/0189613 A1* | 8/2007 | Tanaka | ..................... | G06K 9/80 382/229 |
| 2013/0254190 A1 | 9/2013 | Nakano et al. | | |
| 2014/0002363 A1* | 1/2014 | Griffin | .................. | G06F 3/0237 345/168 |
| 2014/0195953 A1* | 7/2014 | Sakai | .................. | G06F 3/04883 715/771 |
| 2015/0261735 A1* | 9/2015 | Ohguro | ................. | G06F 17/243 715/268 |

FOREIGN PATENT DOCUMENTS

| | | |
|---|---|---|
| JP | 2001-331261 | 11/2001 |
| JP | 2004-213366 | 7/2004 |
| JP | 2010-266969 | 11/2010 |
| JP | 2013-84165 | 5/2013 |
| JP | 2013-196435 | 9/2013 |
| JP | 2013-200843 | 10/2013 |
| JP | 2013-257624 | 12/2013 |

OTHER PUBLICATIONS

Office Action issued by the Japanese Patent Office on Feb. 6, 2018 in corresponding Japanese patent application No. 2014-140630.

* cited by examiner

*Primary Examiner* — Jennifer Mehmood
*Assistant Examiner* — Deeprose Subedi
(74) *Attorney, Agent, or Firm* — Staas & Halsey LLP

(57) ABSTRACT

An input support apparatus includes a processor and a memory configured to store association information in which a character string decided to be inputted on a screen is associated with coordinates at which the character string is inputted on the screen. The processor configured to execute a process including searching the association information for a character string that corresponds to the coordinates of an operation position on the screen for input operation, and outputting the searched-out character string.

17 Claims, 25 Drawing Sheets

FIG. 5

| ORDER RECEIPT ENTRY | | | | 2014/01/16 — 501 |
|---|---|---|---|---|
| ORDER RECEIPT NO. | 01584 | ORDER RECEIPT DATE | 2014 / 01 / 16 | DESIRED DELIVERY DATE ／／ |
| PERSON-IN-CHARGE CODE | | PERSON-IN-CHARGE NAME | | 502 |
| CUSTOMER CODE | | CUSTOMER NAME | | |
| DELIVERY DESTINATION CODE | | DELIVERY DESTINATION NAME | | |

| CODE | PRODUCT NAME | QUANTITY | UNIT PRICE | DISCOUNT | AMOUNT | DELIVERY DATE |
|---|---|---|---|---|---|---|
| | | | | | | |
| | | | | | | |
| | | | | | | |

TOTAL AMOUNT (TAX INCLUDED)

PLEASE ENTER DATA. — 504

NUMBER  3:66 — 503

ORDER RECEIPT ENTRY

| ORDER RECEIPT NO. | 014478 | ORDER RECEIPT DATE | 2013 / 07 / 08 | DESIRED DELIVERY DATE | / / |
|---|---|---|---|---|---|
| PERSON-IN-CHARGE CODE | | PERSON-IN-CHARGE NAME | | | |
| CUSTOMER CODE | | CUSTOMER NAME | | | |
| DELIVERY DESTINATION CODE | | DELIVERY DESTINATION NAME | | | |

| CODE | PRODUCT NAME | QUANTITY | UNIT PRICE | DISCOUNT | AMOUNT | DELIVERY DATE |
|---|---|---|---|---|---|---|

TOTAL AMOUNT (TAX INCLUDED)

PLEASE ENTER DATA.

RB4　　　　　　　　　　　　　　　NUMBER　　　　　　　　　　　3:33

FIG. 7B
(a)
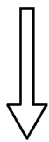
(b)
| ROW NUMBER | CHARACTERISTIC VALUE FOR EACH CURSOR POSITION | SUM OF "1"s | |
|---|---|---|---|
| 1 | 00000000000000000000000000000000000000 | 00 | ~702-1 |
| 2 | 00000000000000000000000001100110011001100 | 08 | ~702-2 |
| 3 | 0011111111100000111110001111111110111101101 | 27 | ~702-3 |
| 4 | 00111111111111000000000111111110000000000 | 20 | ~702-4 |
| 5 | 00111111111111000000000111111110000000000 | 20 | ~702-5 |
| 6 | 00111111111111000000000111111110000000000 | 20 | ~702-6 |
| 7 | 00000000000000000000000000000000000000 | 00 | ~702-7 |
| 8 | 001111000000000110011001100000000000001 | 11 | ~702-8 |
| 9 | 00000000000000000000000000000000000000 | 00 | ~702-9 |
| 10 | 00000000000000000000000000000000000000 | 00 | ~702-10 |
| 11 | 00000000000000000000000000000000000000 | 00 | ~702-11 |
| 12 | 00000000000000000000000000000000000000 | 00 | ~702-12 |
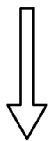
(c) BUSINESS-SCREEN CHARACTERISTIC VALUE: 000827202020001100000000

FIG. 8

CONTROL DATA: LATERAL-RULED-LINE RENDERING INSTRUCTION

| 0x1A | ROW POSITION | START COLUMN | END COLUMN |
|---|---|---|---|

4 BYTES

CONTROL DATA: VERTICAL-RULED-LINE RENDERING INSTRUCTION

| 0x1B | ROW POSITION | START COLUMN | END COLUMN |
|---|---|---|---|

4 BYTES

CONTROL DATA: CHARACTER-INPUT-REGION POSITION INSTRUCTION

| 0x1C | ROW POSITION | START COLUMN | END COLUMN |
|---|---|---|---|

4 BYTES

FIG. 12A

| ORDER RECEIPT ENTRY | | | | 2014/01/16 |
|---|---|---|---|---|
| ORDER RECEIPT NO. | 01584 | ORDER RECEIPT DATE | 2014 / 01 / 16 | DESIRED DELIVERY DATE  /  / |
| PERSON-IN-CHARGE CODE | | PERSON-IN-CHARGE NAME | | |
| CUSTOMER CODE | | CUSTOMER NAME | | |
| DELIVERY DESTINATION CODE | | DELIVERY DESTINATION NAME | | |

| CODE | PRODUCT NAME | QUANTITY | UNIT PRICE | DISCOUNT | AMOUNT | DELIVERY DATE |
|---|---|---|---|---|---|---|
| | | | | | | |
| | | | | | | |
| | | | | | | |
| | | | | TOTAL AMOUNT (TAX INCLUDED) | | |

501

503 (3:66)

504

PLEASE ENTER DATA.

READY FOR ENTRY OF NUMBERS ONLY        NUMBER

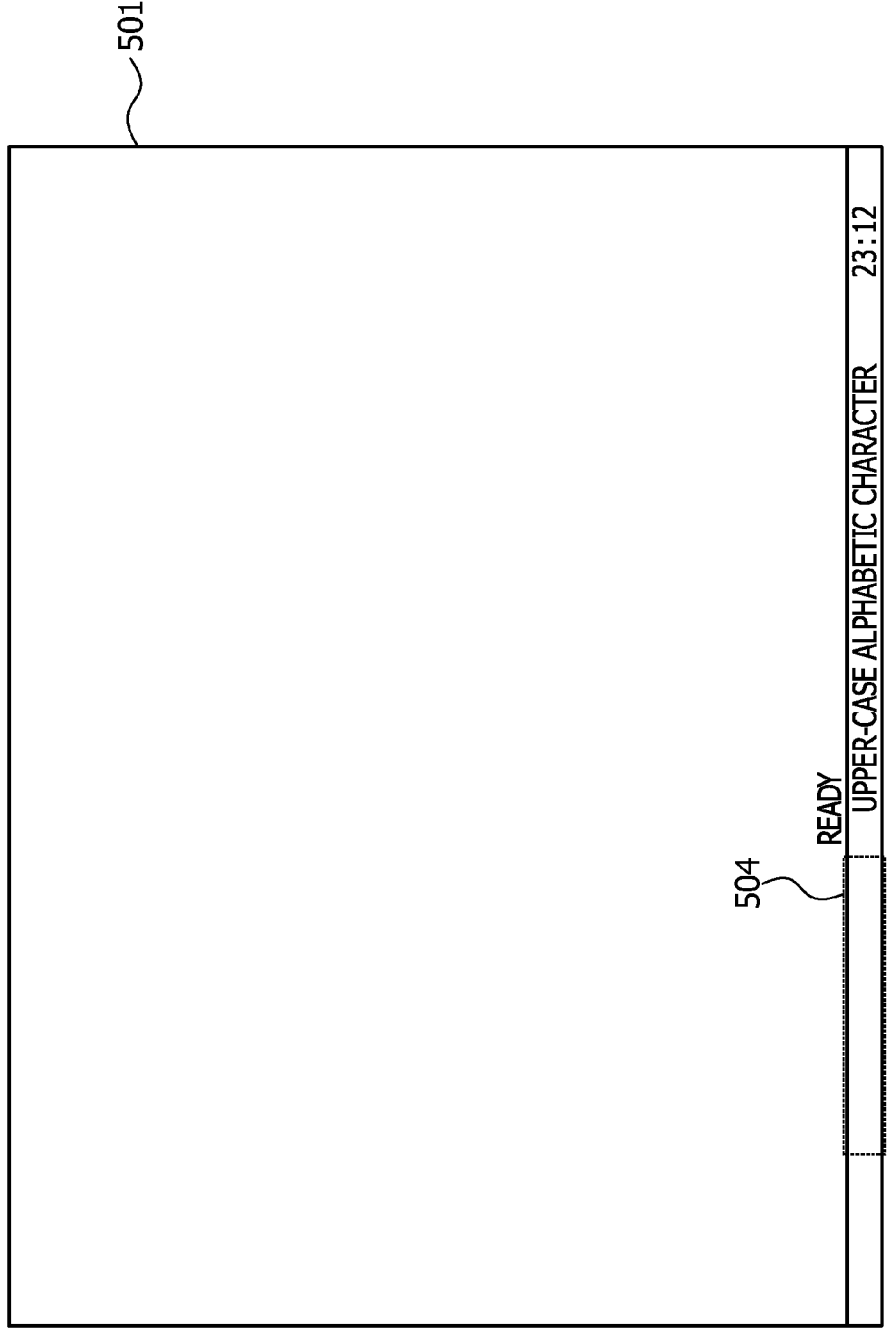

ORDER RECEIPT ENTRY      2013/07/02

| ORDER RECEIPT NO. | 01478 | ORDER RECEIPT DATE | 2013 / 07 / 08 | DESIRED DELIVERY DATE | 2013 / 08 / 08 |
|---|---|---|---|---|---|
| PERSON-IN-CHARGE CODE | 108 | PERSON-IN-CHARGE NAME | | | |
| CUSTOMER CODE | 618 | CUSTOMER NAME | | | |
| DELIVERY DESTINATION CODE | 181 | DELIVERY DESTINATION NAME | | | |

| CODE | PRODUCT NAME | QUANTITY | UNIT PRICE | DISCOUNT | AMOUNT | DELIVERY DATE |
|---|---|---|---|---|---|---|
| 101 | SHORT UNDERSHIRT NEWBORN/YELLOW | 10 | ¥1,800 | | | ¥ 18,000 |
| 108 | SHORT UNDERSHIRT M/BLUE | 20 | ¥1,800 | | | ¥ 36,000 |
| 118 | LONG UNDERSHIRT NEWBORN/WHITE | 30 | ¥2,000 | | | ¥ 60,000 |
| 168 | B-TYPE BABY BUGGY TYPE 3 | 50 | ¥22,800 | | | ¥1,140,000 |
| 188 | CHILD SEAT COVER BLUE | 60 | ¥3,600 | | | ¥216,000 |
| 198 | TEETHING TOY | 80 | ¥700 | | | ¥56,000 |

| TOTAL AMOUNT (TAX INCLUDED) | ¥1,602,300 |
|---|---|

PLEASE CONFIRM.

UPPER-CASE ALPHABETIC CHARACTER      22:79

(12) United States Patent

INPUT SUPPORT APPARATUS, INFORMATION PROCESSING SYSTEM, METHOD, AND STORAGE MEDIUM

CROSS-REFERENCE TO RELATED APPLICATION

This application is based upon and claims the benefit of priority of the prior Japanese Patent Application No. 2014-140630, filed on Jul. 8, 2014, the entire contents of which are incorporated herein by reference.

FIELD

The embodiments discussed herein are related to an input support apparatus, an information processing system, a method, and a storage medium.

BACKGROUND

Conventionally, there have been techniques of assisting a user to perform a character input operation. In these techniques, when a user inputs characters, character strings are selected from a set of registered character strings and then are outputted as input candidates, so that an operation amount for character input by the user may be reduced. For example, in a related technique, a recommended item list to be inserted in a purchase list of a specific user are determined by referring to a purchase list of another user different from the specific user, and the purchase list and the recommended item list are displayed in a mixed manner as a list. In another related technique, a search is performed by using, as a search keyword, a first recommendation keyword that is a keyword candidate partially matching with an input character string yet to be decided, or a second recommendation keyword that is another candidate different from the first recommendation keyword and included in a keyword group to which the first recommendation keyword belongs.

Japanese Laid-open Patent Publication Nos. 2013-84165 and 2013-196435 disclose these related techniques.

However, according to the conventional techniques, when a user inputs characters on a predetermined screen, it is difficult to output a character string corresponding to an input character string that the user desires to input.

SUMMARY

According to an aspect of the invention, an input support apparatus includes a processor and a memory configured to store association information in which a character string decided to be inputted on a screen is associated with coordinates at which the character string is inputted on the screen. The processor configured to execute a process including searching the association information for a character string that corresponds to the coordinates of an operation position on the screen for input operation, and outputting the searched-out character string.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is an explanatory diagram illustrating an example of a business screen;

FIGS. 7A and 7B are explanatory diagrams illustrating a first generation example of generating a business-screen characteristic value;

FIG. 8 is an explanatory diagram illustrating a format example of business screen data;

FIGS. 12A and 12B are explanatory diagrams illustrating an example of determining validity of a decided character string;

FIG. 13 is an explanatory diagram illustrating a screen example after completion of input;

DESCRIPTION OF EMBODIMENTS

According to an aspect of the present disclosure, a character string inputted in the past and corresponding to an operation position related to an input on a predetermined screen may be outputted. Embodiments of an input support apparatus, an input support system, an input support method, and an input support program will be described in detail below with reference to the drawings.

Figure 1:
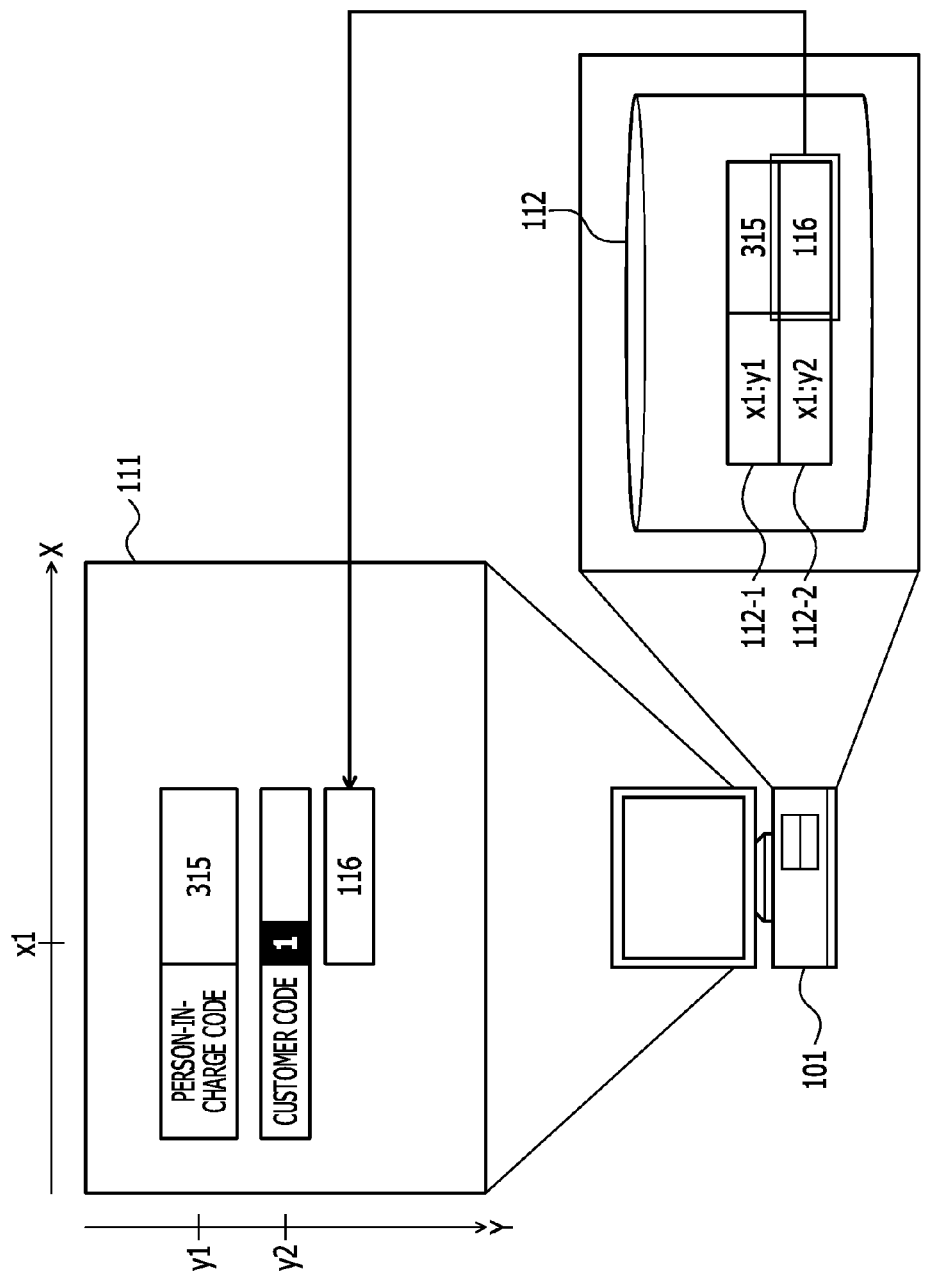
FIG. 1 is an explanatory diagram illustrating an operation example of an input support apparatus.

FIG. 1 is an explanatory diagram illustrating an operation example of an input support apparatus 101. The input support apparatus 101 is a computer that outputs a character string similar to an input character string being inputted, by selecting the character string from a history of character strings decided to be inputted. The input support apparatus 101 is, for example, a personal computer. Further, the input support apparatus 101 may be a portable terminal. If outputting a character string similar to an input character string enables outputting of a character string that a user is about to input, the user may skip character input. A technique of presuming a character string that a user is about to input is called "input completion", "autocompletion", or the like.

The technique of presuming a character string that a user is about to input will be hereinafter merely referred to as "input completion". In addition, a character string outputted by the input completion will be referred to as "input-candidate character string".

For example, in response to input processing after key input, an apparatus performing the input completion searches for an input-candidate character string based on an input character string inputted by the key input, and displays the input-candidate character string. The apparatus performing the input completion then selects either the input-candidate character string or the input character string, and performs the input processing again, thereby deciding input of the selected character string. Here, the input processing is processing of converting or deciding a character string. For example, the apparatus performing the input completion performs the input processing in response to a press of an ENTER key. A character string decided to be inputted may be hereinafter sometimes referred to as "decided character string".

Here, in the input completion, for an input character string being inputted, a character string, which includes a character string completely or partially matching with the input character string, is acquired from a set of character strings registered in a storage region, and the acquired character string is outputted as an input-candidate character string. For example, it is conceivable to perform the input completion, by storing a character string inputted corresponding to identification information of a character-input region in a screen, and by outputting the stored character string according to the character-input region when input operation is performed in this character-input region. However, when software forming a certain screen is different from software performing the input completion, it is difficult to determine which character-input region in the certain screen corresponds to the inputted character string. In addition, if a character string to become an input candidate is outputted according to an input character string, based on all character strings inputted on a certain screen, a character string irrelevant to a user may be outputted.

Therefore, the input support apparatus 101 illustrated in FIG. 1 searches for a character string corresponding to an operation position on a screen, from a table where a character string decided to be inputted on the screen is associated with a coordinate position of the input of the character string. This allows the input support apparatus 101 to display an input log of a character-input region provided below the operation position on the screen, thereby supporting character input operation performed by a user.

First, the input support apparatus 101 displays a predetermined screen. For example, the predetermined screen is a screen rendered by software providing a certain business service. Alternatively, the predetermined screen may be a business screen rendered based on screen information transmitted form an information processing apparatus that provides a certain business service. Still alternatively, the predetermined screen may be a screen rendered by remote screen-controlling software that remotely controls a screen of another computer. For example, a screen 111 illustrated in FIG. 1 displays a business screen.

Specifically, the screen 111 has a character string of "person-in-charge code", a character-input region for input of a person-in-charge code, a character string of "customer code", and a character-input region for input of a customer code. The input support apparatus 101 illustrated in FIG. 1 is in such a state that a character string of "315" is inputted in the character-input region for input of a person-in-charge code and then decided, by operation of a user of the input support apparatus 101. Further, the input support apparatus 101 illustrated in FIG. 1 is in such a state that an input character string "1" is inputted in the character-input region for input of a customer code.

The input support apparatus 101 then searches an input candidate table 112 for a character string corresponding to an operation position related to input on the predetermined screen 111. The operation position related to the input may be a coordinate position on the predetermined screen 111 at which any of characters in an input character string is inputted on the predetermined screen 111, or may be a position of a cursor or a focus on the predetermined screen 111. In the example of FIG. 1, the input support apparatus 101 searches for a character string corresponding to a coordinate position on the predetermined screen 111 at which an input character string being inputted on the predetermined screen 111 is inputted.

Here, the input candidate table 112 is a table that stores a decided character string decided to be inputted on the predetermined screen 111, and a coordinate position, at which the decided character string is inputted, on the predetermined screen 111. The decided character string and the coordinate position are associated with each other in the input candidate table 112. The input candidate table 112 illustrated in FIG. 1 has a record 112-1 indicating that a decided character string inputted at a X-coordinate x1 and a Y-coordinate y1 is "315", and a record 112-2 indicating that a decided character string inputted at the X-coordinate x1 and a Y-coordinate y2 is "116".

In the example of FIG. 1, the input support apparatus 101 detects the record 112-2 from the input candidate table 112. The record 112-2 has the same coordinate position as a coordinate position formed of an X-coordinate x1 and a Y-coordinate y2 where an input character string of "1" being inputted is inputted, on the predetermined screen 111. The input support apparatus 101 then outputs the decided character string of "116" in the detected record 112-2. Here, the input support apparatus 101 may output the decided character string of "116" to a part in the predetermined screen 111 or to a part outside and below the predetermined screen 111. When input processing is performed in a state where the outputted character string is selected, the input support apparatus 101 stores the outputted character string "116", in the character-input region for input of a customer code in the predetermined screen 111.

Next, an example in which an input support system is applied to a business system will be described with reference to FIG. 2. In this input support system, the input support apparatus 101 is connected to an information processing apparatus that transmits screen information for the predetermined screen 111 to the input support apparatus 101.

Figure 2:
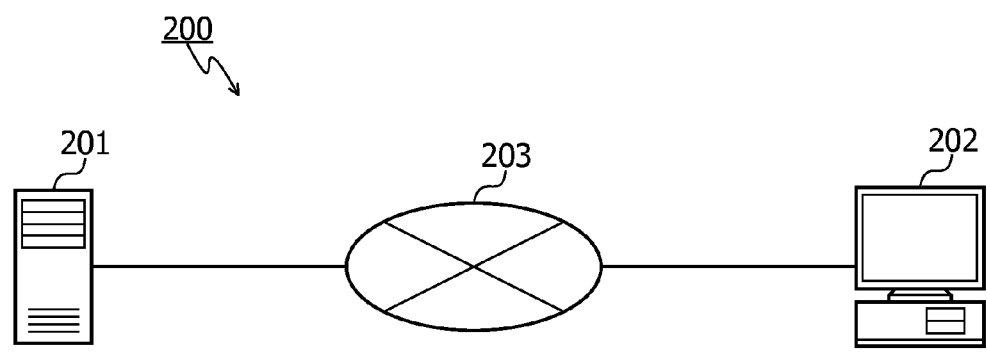
FIG. 2 is an explanatory diagram illustrating a connection example of a business system.

FIG. 2 is an explanatory diagram illustrating a connection example of a business system 200. The business system 200 includes a server 201 and a client terminal 202. Here, the client terminal 202 is equivalent to the input support apparatus 101 illustrated in FIG. 1.

The client terminal 202 may be included as one client terminal, or as each of two or more client terminals, in the business system 200. The server 201 and the client terminal 202 are connected to each other via a network 203. The business system 200 is a system using a display emulator. Here, the display emulator is software that imitates a client apparatus using a business service provided by the server 201. Further, the display emulator is the software running on the client terminal 202. Furthermore, the display emulator forms a screen provided by a character input interface.

The server 201 is an information processing apparatus that transmits screen information of a business screen to the client terminal 202. Specifically, the server 201 performs reading and writing from and to a database in the server 201 and the display emulator, by controlling a business program running on the server 201. An example of the hardware of the server 201 will be described with reference to FIG. 3. The client terminal 202 is caused by the display emulator to display the business screen based on the screen information transmitted from the server 201, and is operated by a user of the client terminal 202.

Next, a hardware configuration example of the server 201 will be described using FIG. 3, and a hardware configuration example of the client terminal 202 will be described using FIG. 4.

Figure 3:
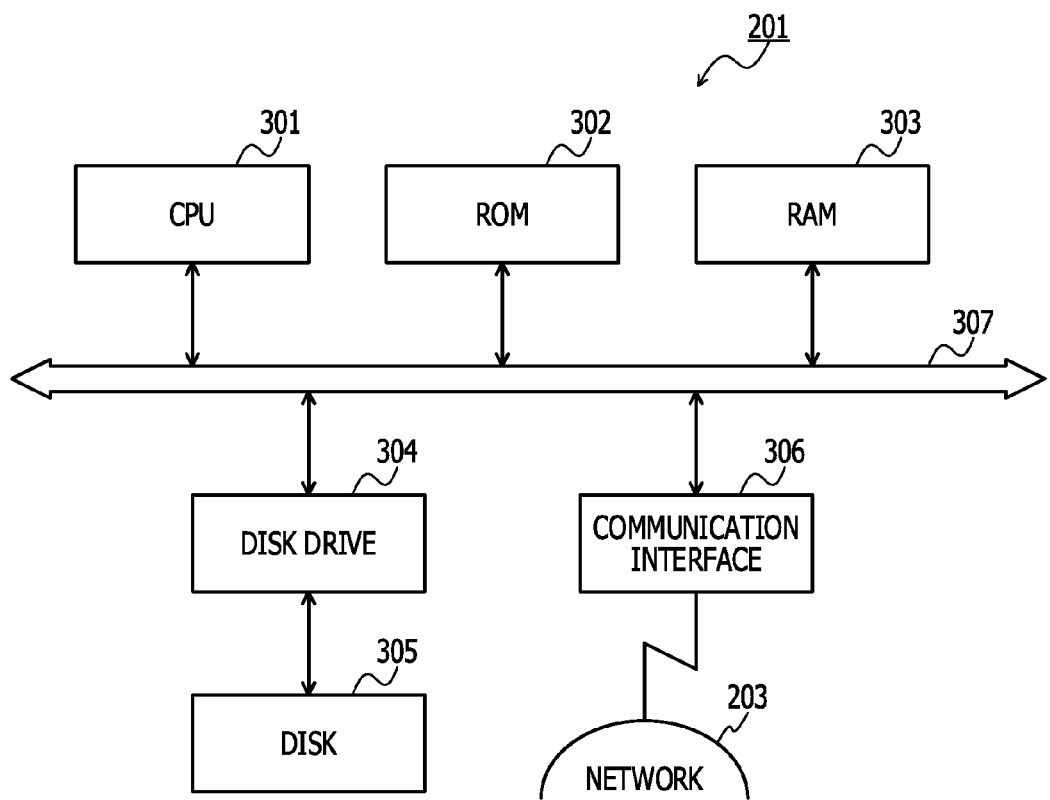
FIG. 3 is a block diagram illustrating a hardware configuration example of a server.

FIG. 3 is a block diagram illustrating the hardware configuration example of the server 201. In FIG. 3, the server 201 includes a central processing unit (CPU) 301, a read only memory (ROM) 302, and a random access memory (RAM) 303. The server 201 further includes a disk drive 304 and a disk 305, as well as a communication interface 306. Further, the CPU 301 to the disk drive 304 as well as the communication interface 306 is interconnected by a bus 307.

The CPU 301 is an arithmetic processing unit that performs overall control of the server 201. The ROM 302 is a nonvolatile memory that stores a program such as a boot program. The RAM 303 is a volatile memory used as a work area of the CPU 301.

The disk drive 304 is a control device that controls reading and writing of data from and to the disk 305, according to the control of the CPU 301. For example, a magnetic disk drive, a solid-state drive, or the like may be adopted as the disk drive 304. The disk 305 is a nonvolatile memory that stores data written based on the control of the disk drive 304. For example, when the disk drive 304 is a magnetic disk drive, a magnetic disk may be adopted as the disk 305. Further, when the disk drive 304 is a solid-state drive, a semiconductor memory formed of a semiconductor element, which is a so-called semiconductor disk, may be adopted as the disk 305.

The communication interface 306 is a control device that interfaces between the inside and the network 203, and controls input and output of data with respect to other device. Specifically, the communication interface 306 is connected to other device through a communication line via the network 203. For example, a modem, a local area network (LAN) adapter, or the like may be adopted as the communication interface 306.

When an administrator of the business system 200 directly operates the server 201, the server 201 may have hardware such as a display, a keyboard, and a mouse.

Figure 4:
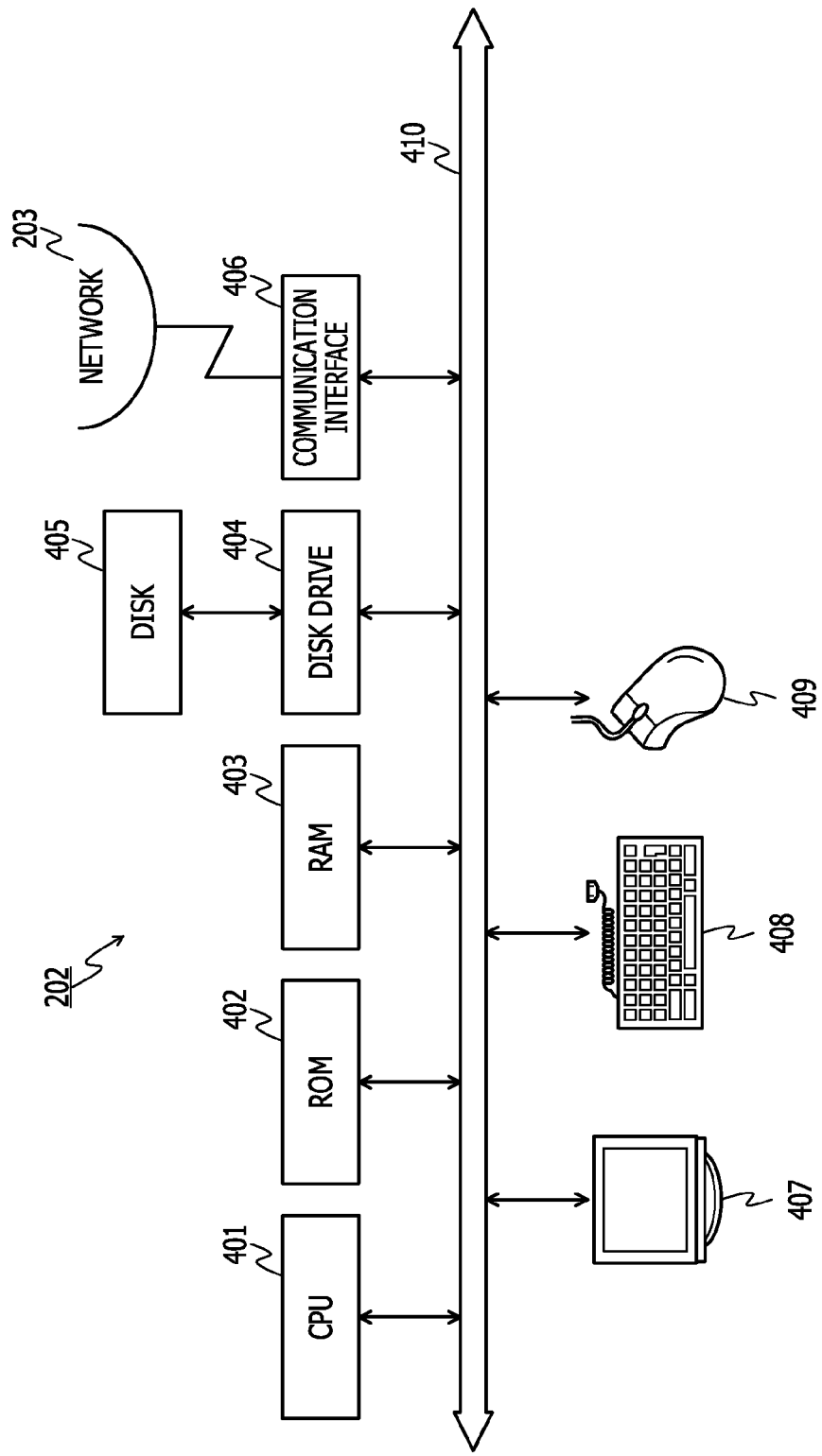
FIG. 4 is a block diagram illustrating a hardware configuration example of a client terminal.

FIG. 4 is a block diagram illustrating the hardware configuration example of the client terminal 202. The client terminal 202 includes a CPU 401, a ROM 402, and a RAM 403. The client terminal 202 further includes a disk drive 404 and a disk 405, as well as a communication interface 406. The client terminal 202 further includes a display 407, a keyboard 408, and a mouse 409. Further, the CPU 401 is connected to the disk drive 404 via a bus 410 and the communication interface 406 is connected to the mouse 409 via the bus 410.

The CPU 401 is an arithmetic processing unit that performs overall control of the client terminal 202. The ROM 402 is a nonvolatile memory that stores a program such as a boot program. The RAM 403 is a volatile memory used as a work area of the CPU 401.

The disk drive 404 is a control device that controls reading and writing of data from and to the disk 405, according to the control of the CPU 401. For example, a magnetic disk drive, an optical disk drive, a solid-state drive, or the like may be adopted as the disk drive 404. The disk 405 is a nonvolatile memory that stores data written based on the control of the disk drive 404. For example, when the disk drive 404 is a magnetic disk drive, a magnetic disk may be adopted as the disk 405. Further, when the disk drive 404 is an optical disk drive, an optical disk may be adopted as the disk 405. Furthermore, when the disk drive 404 is a solid-state drive, a semiconductor memory formed of a semiconductor element, which is a so-called semiconductor disk, may be adopted as the disk 405.

The communication interface 406 is a control device that interfaces between the inside and the network 203, and controls input and output of data with respect to an external device. The communication interface 406 is connected to other device through a communication line via the network 203. For example, a modem, an LAN adapter, or the like may be adopted as the communication interface 406.

The display 407 is a device that displays a mouse cursor, an icon, and a tool box, as well as data such as a document, an image, and function information. For example, a cathode ray tube (CRT), a thin film transistor (TFT), a liquid crystal display, a plasma display, or the like may be adopted as the display 407.

The keyboard 408 is a device that includes keys for input of characters, numbers, various instructions, and the like, and performs input of data. The keyboard 408 may be a touch-panel-type input pad, a numeric keypad, or the like. The mouse 409 is a device that performs movement and range selection of the mouse cursor, or movement and size change of a window. The mouse 409 may be a trackball, a joystick, or the like if functions similar to those described above are provided to serve as a pointing device.

FIG. 5 is an explanatory diagram illustrating an example of the business screen. FIG. 5 illustrates an order receipt entry screen 501 as an example of the business screen. In the example of FIG. 5, a cursor 502 is present in an input item for input of a desired delivery date, in the order receipt entry screen 501. All the business screens in the present embodiment each have a region of 24 rows and 80 columns, the unit area of which is the size of a cursor. Further, in the business screen, there is a cursor-coordinates display region that displays a character string indicating the coordinate position of the cursor. For example, the order receipt entry screen 501 displays "3:66" as the coordinate position of the cursor 502, in a cursor-coordinates display region 503. Furthermore, in the business screen, there is a region that displays a character string indicating the status of the business screen. For example, the order receipt entry screen 501 has a status display region 504 that displays a character string indicating the status of the order receipt entry screen. In the example of FIG. 5, no character string is displayed in the status display region 504.

In many cases, numbers but characters are accepted, or alphanumeric characters but other type of characters are accepted, in input items of the business screen. For example, the input item for an order receipt date and the input item for a desired delivery date in the order receipt entry screen 501 are input items that accept alphanumeric characters but other type of characters.

Function Configuration Example of Client Terminal 202

Figure 6:
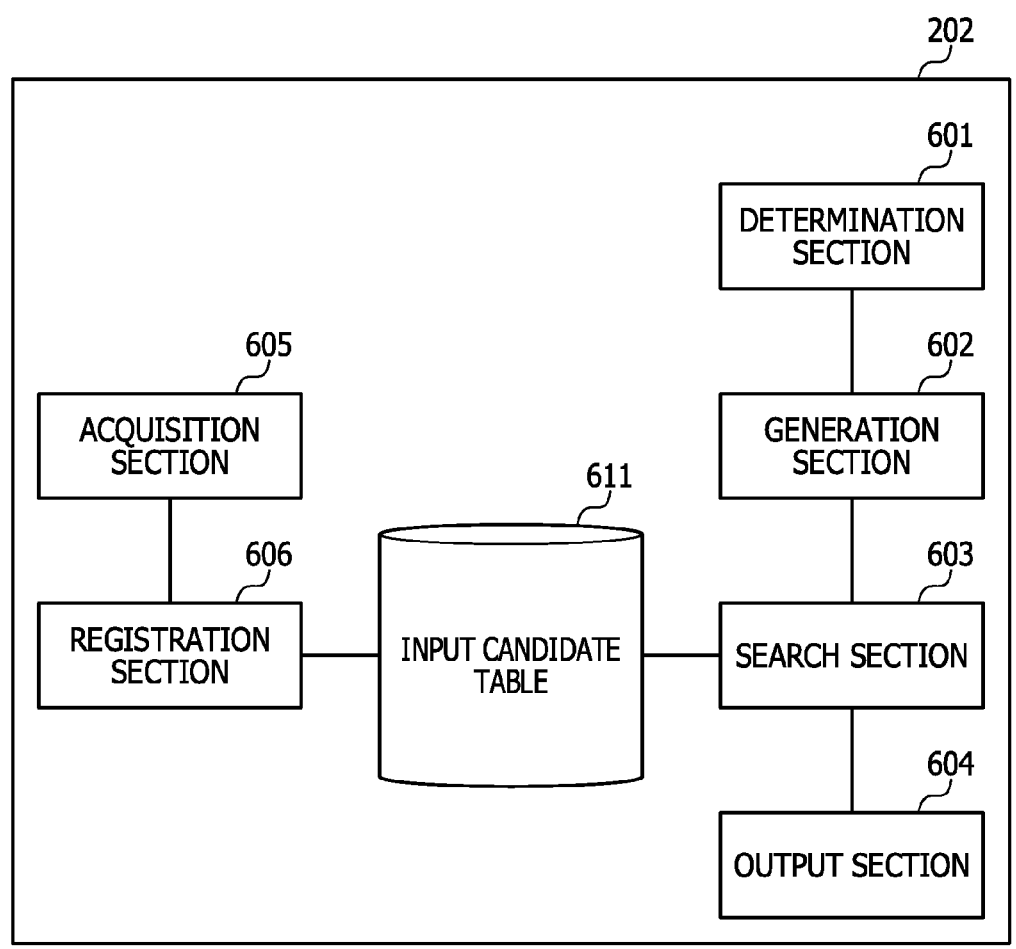
FIG. 6 is a block diagram illustrating a function configuration example of the client terminal.

FIG. 6 is a block diagram illustrating a function configuration example of the client terminal 202. The client terminal 202 includes a determination section 601, a generation section 602, a search section 603, an output section 604, an acquisition section 605, and a registration section 606. The determination section 601 to the registration section 606 each serve as a control section, and each implement the function of each part, when a program stored in a storage device is executed by the CPU 401. The storage device is, specifically, for example, the device such as the ROM 402, the RAM 403, and the disk 405 illustrated in FIG. 4. Further, a processing result of each part is stored in a register of the CPU 401, a cache memory of the CPU 401, or the like.

Further, the client terminal 202 is allowed to access an input candidate table 611. The input candidate table 611 is stored in a storage device such as the RAM 403 and the disk 405. The input candidate table 611 may be included in the server 201, and thereby made accessible by two or more client terminals 202.

The input candidate table 611 stores, as a business screen, a decided character string decided to be inputted on the business screen, and a coordinate position, at which the decided character string is inputted, on the business screen, such that the decided character string and the coordinate position are associated with each other. Further, the input candidate table 611 may store a value characterizing a business screen, a character string decided to be inputted on the business screen, and a coordinate position, at which the decided character string is inputted, on the business screen, such that the value, the character string, and the coordinate position are associated with one another. The input candidate table 611 may store information about one business screen, or may store information about two or more business screens. An example of storage content of the input candidate table 611 will be described with reference to FIG. 10.

The determination section 601 determines, corresponding to a division region of a divided business screen, a value characterizing the division region, based on the value of each pixel of the business screen. The division region may be of any size. For example, the determination section 601 divides the business screen by using the size of a cursor. Further, the determination section 601 may determine a value characterizing for all the division regions of the divided business screen, or may determine a value characterizing some of the division regions of the divided business screen.

Such a characterizing value will be hereinafter referred to as "characteristic value". Further, the characteristic value of the business screen will be referred to as "business-screen characteristic value".

For example, when the values of the respective pixels of the division region all indicate a background color, the determination section 601 determines the characteristic value to be "0" representing a background. A more specific example of determining the characteristic value will be described with reference to FIGS. 7A and 7B.

The generation section 602 generates a business-screen characteristic value, based on screen information of a business screen. The screen information of the business screen is, for example, information that allows formation of the business screen. For example, this information may be a value of each pixel of the business screen, or may be a coordinate position of a ruled line and a coordinate position of a character-input region in the business screen. For example, the generation section 602 may generate the business-screen characteristic value, based on the characteristic value of the division region determined by the determination section 601. Further, the generation section 602 may generate the business-screen characteristic value, based on the coordinate position of the ruled line in the business screen, or the coordinate position of the character-input region in the business screen. An example of generating a business-screen characteristic value based on a coordinate position of a ruled line in a business screen or a coordinate position of a character-input region in a business screen will be described with reference to FIGS. 8 and 9.

The search section 603 searches the input candidate table 611 for a character string corresponding to an operation position related to input on a business screen. Here, the operation position related to the input may be a coordinate position, at which any character in an input character string being inputted on the business screen is inputted, on the business screen. Further, the operation position related to the input may be the position of a cursor on the business screen, when the business screen is provided by the character input interface. Furthermore, the operation position related to the input may be the position of a focus or the position of a mouse cursor on the business screen, when the business screen is provided by a graphical user interface. When the position of the mouse cursor is adopted, the search section 603 may search the input candidate table 611 for a decided character string whose coordinate position is in a predetermined range relative to the position of the mouse cursor.

Further, the search section 603 searches the input candidate table 611 for a character string, which corresponds to a business-screen characteristic value generated by the generation section 602 and to an operation position. Furthermore, the search section 603 may search the input candidate table 611 for a character string that corresponds to any character in an input character string being inputted and to a coordinate position on a business screen at which this character is inputted. For example, the search section 603 may search the input candidate table 611 for a record that has a coordinate position identical with an operation position and has a character matching with a leading character of an input character string.

Assume the input candidate table 611 is included in the server 201, and is accessible by two or more client terminals 202. In this case, the search section 603 retrieves a character string corresponding to an operation position, by transmitting the operation position to the server 201, and then receiving, from the server 201, a search result indicating a character string corresponding to the operation position in the input candidate table 611.

The output section 604 outputs a character string searched out by the search section 603. Displaying the character string on the display 407 is adopted as an output form.

When input of a character string is decided on a business screen, the acquisition section 605 acquires information indicating whether the character string is valid. Specifically, the acquisition section 605 may acquire the information indicating whether the character string is valid, by analyzing an image displayed in the status display region 504, or may acquire such information from the display emulator if possible. An example of an invalid character string is a character string formed of double-width numbers, in a character-input region that accepts only input of single-width numbers, on the business screen.

When it is determined that an input character string is valid based on information acquired by the acquisition section 605, the registration section 606 registers, in the input candidate table 611, a character string indicating the input character string, and a coordinate position on a business screen at which the input character string is inputted, such that the character string and the coordinate position are associated with each other. For example, the client terminal 202 registers an invalid character string beforehand. Subsequently, when information acquired by the acquisition section 605 is different from the invalid character string registered beforehand, the client terminal 202 determines that the information acquired by the acquisition section 605 is valid.

Next, generation examples of generating business-screen characteristic values will be described. The generation examples of generating the business-screen characteristic values are broadly divided into two types. A first generation example will be described with referenced to FIGS. 7A and 7B. Subsequently, a format example of business screen data to be used in a second generation example will be described with reference to FIG. 8, and the second generation example will be described with reference to FIG. 9.

FIG. 7A is an explanatory diagram illustrating the first generation example of generating a business-screen characteristic value (Part 1). Further, FIG. 7B is another explanatory diagram illustrating the first generation example of generating the business-screen characteristic value (Part 2). The first generation example of generating the business-screen characteristic value is a method of generating a business-screen characteristic value from a bitmap of a business screen. The client terminal 202 may use either a whole or a part of a currently displayed screen, for identification of a business screen. In the present embodiment, as illustrated in FIG. 7A, the client terminal 202 uses a region corresponding to an upper left quarter of the order receipt entry screen 501 currently displayed, specifically, a region of 12 rows and 40 columns, the unit area of which is the size of the cursor, for the identification of the business screen. The client terminal 202 acquires a bitmap of a business screen, for example, from a video RAM (VRAM) in which the bitmap of the business screen is written by the display emulator.

As illustrated in FIG. 7A, the region corresponding to the upper left quarter includes "order receipt entry" that is the title of this business screen, and excludes the current date of "2013/07/02". Selecting a region that is likely to include the title of a business screen makes it possible to improve accuracy of screen identification. In addition, selecting a region that is unlikely to include the current date makes it less likely to identify the same screen as a different screen.

Next, the client terminal 202 determines a characteristic value corresponding to the position of each cursor in the region of 40 rows and 12 columns. Here, the client terminal 202 sets "1" or "0" as a characteristic value, for the range of each cursor. Here, the client terminal 202 determines the characteristic value, based on a bitmap included in the position of each cursor.

For example, assume that a background color is white, which is a RGB value of "0xFFFFFF". In this case, the client terminal 202 sets "0" as a characteristic value if each of the RGB values of all the bits included in the position of a certain cursor is "0xFFFFFF", and sets "1" as a characteristic value if there is another RGB value. In an example of Part (a) of FIG. 7B, there is a black bit of an RGB value of "0x000000" among bits included in the position of a cursor 701, the client terminal 202 sets "1" as a characteristic value corresponding to the position of the cursor 701.

The client terminal 202 determines a characteristic value corresponding to each cursor position, in each row. A table 702 illustrated in Part (b) of FIG. 7B is a collection of values corresponding to the respective cursor positions in each row. The table 702 illustrated in Part (b) of FIG. 7B has records 702-1 to 702-12.

The table 702 has a field representing a row number, a field representing a characteristic value corresponding to each cursor position, and a field representing a sum of "1"s. In the field representing the row number, the row number of each row is stored. In the field representing the characteristic value corresponding to each cursor position, a characteristic value corresponding to each cursor position in each row is stored. In the field representing the sum of "1"s, data, in which a sum of the characteristic values "1" in each row is indicated by a character string representing a two-digit number, is stored. For example, there are eight "1"s in a second row, and therefore, the record 702-2 indicates "08" as the sum of "1"s.

Next, the client terminal 202 generates data, in which the sums of "1"s in the respective rows are connected to form a character string, as a business-screen characteristic value. In an example of Part (c) of FIG. 7B, the client terminal 202 generates "000827202020001100000000" illustrated in the table 702, as a business-screen characteristic value of the order receipt entry screen 501.

The client terminal 202 is allowed to register business screens having similar screen configurations as one business screen, by executing the first generation example of generating the business-screen characteristic value. Specifically, for example, in a cursor position of the order receipt entry screen 501 and in the corresponding cursor position of an ordering business screen, identical contents are inputted, in many cases. For example, the ordering business screen includes the same input items as the input items for a person-in-charge code, a customer code, and a delivery destination code in the order receipt entry screen 501. Character strings inputted in these input items in the order receipt entry screen 501 are identical with character strings inputted in these input items in the ordering business screen, in many cases. Therefore, in the first generation example of generating the business-screen characteristic value, business screens having similar screen configurations may be registered as one business screen, by replacing a bitmap of a screen with a value corresponding to each cursor position, instead of directly using the bitmap for identification of the screen.

FIG. 8 is an explanatory diagram illustrating a format example of business screen data. The second generation example of generating the business-screen characteristic value is a method of generating a business-screen characteristic value, from business screen data transmitted from the server 201. Therefore, the format example of the business screen data will be described with reference to FIG. 8.

Here, in the present embodiment, the business screen data transmitted from the server 201 is in a format illustrated in FIG. 8. Specifically, the business screen data is formed by repeating control data or character data. The control data is data indicating an instruction to render a lateral ruled line or a vertical ruled line, or data indicating an instruction for a position of a character-input region. The character data is data including the coordinate position of a character and a character string to be rendered. If the value of a leading byte of business screen data is less than 0x20, the client terminal 202 determines the data to be the control data. On the other hand, if this value is 0x20 or more, the client terminal 202 determines the data to be the character data. As for the control data, contents to be controlled and a data length are determined beforehand. Therefore, if the data is determined to be the control data, the client terminal 202 determines again, after processing the control data, whether the data is the control data or the character data, by referring to the value of the next byte designated by the data length of the control data.

FIG. 8 illustrates an example of the control data. For example, a lateral-ruled-line rendering instruction, which is the control data indicating an instruction to render a lateral ruled line, is 4-byte data beginning with 0x1A and including a row position, a start column, and an end column. When detecting the lateral-ruled-line rendering instruction in the business screen data, the client terminal 202 renders a lateral ruled line from the start column to the end column, on a lower side of the designated row position. Meanwhile, a character-input-region position instruction, which is the control data indicating an instruction for a position of a character-input region, is 4-byte data beginning with 0x1C and including a row position, a start column, and an end column. When detecting the character-input-region position instruction in the business screen data, the client terminal 202 sets a region from the start column to the end column at the specified row position, as a character-input region.

Figure 9:
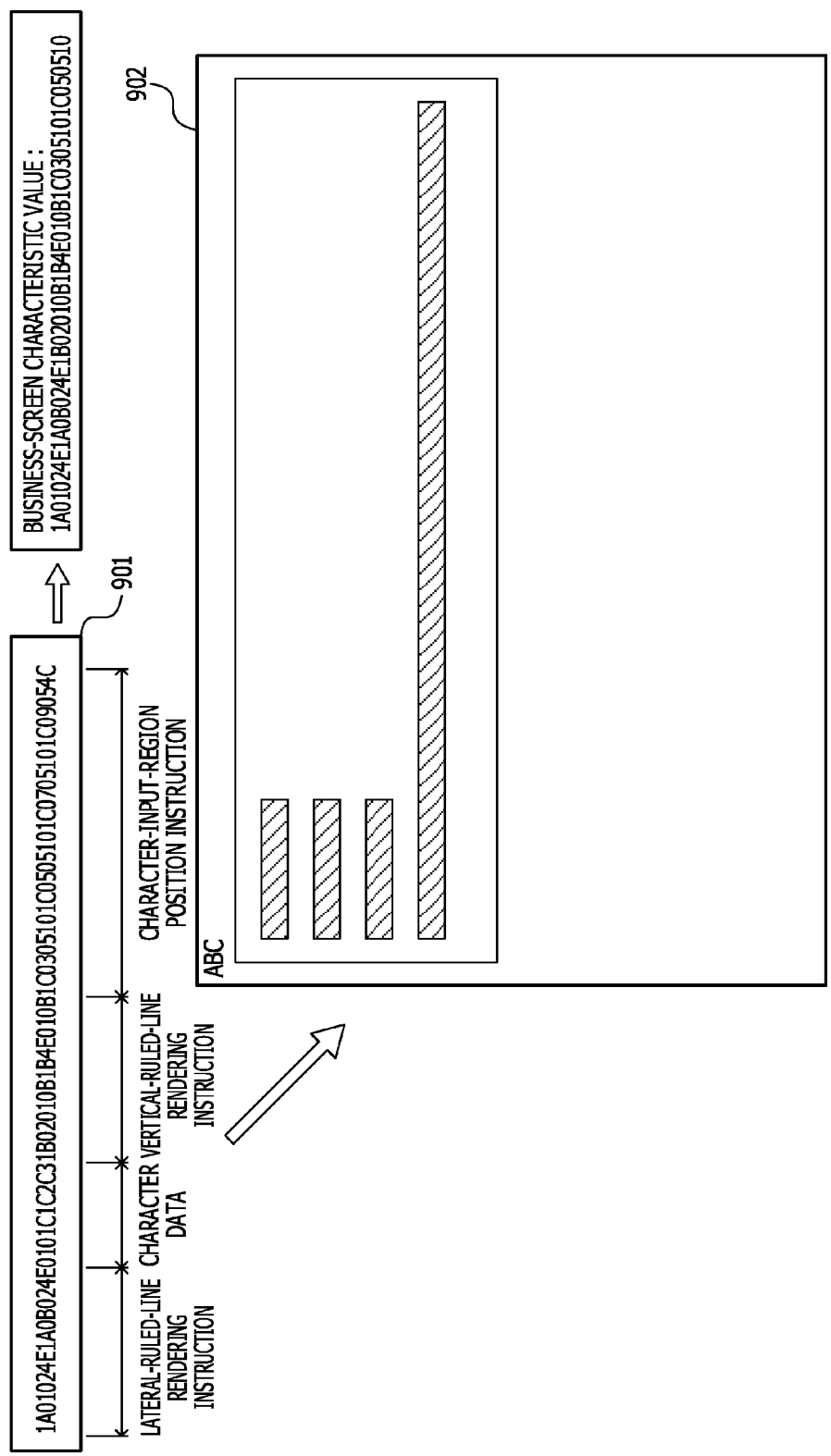
FIG. 9 is an explanatory diagram illustrating a second generation example of generating a business-screen characteristic value.

FIG. 9 is an explanatory diagram illustrating the second generation example of generating the business-screen characteristic value. The client terminal 202 generates, as a business-screen characteristic value, data formed by excluding character data from business screen data received from the server 201. The client terminal 202 may generate the whole of the data formed by excluding the character data from the business screen data, as the business-screen characteristic value, or may generate a part of the data formed by excluding the character data from the business screen data, as the business-screen characteristic value. Further, the client terminal 202 may generate data formed by connecting a lateral-ruled-line rendering instruction and a vertical-ruled-line rendering instruction of the business screen data with each other, as the business-screen characteristic value, or may generate a character-input-region position instruction of the business screen data, as the business-screen characteristic value.

First, the client terminal 202 generates data by excluding the character data from the business screen data. In the example of FIG. 9, it is assumed that business screen data 901 is received from the server 201. Rendering the business screen data 901 according to the format described with reference to FIG. 8 results in a business screen 902. The client terminal 202 then generates 24-byte data of "1A01024E1A0B024E1B02010B1B4E010B1C0305101C050510" heading the generated data, as the business-screen characteristic value. In the following, an example of using a business-screen characteristic value generated by the first generation example will be described.

Figure 10:
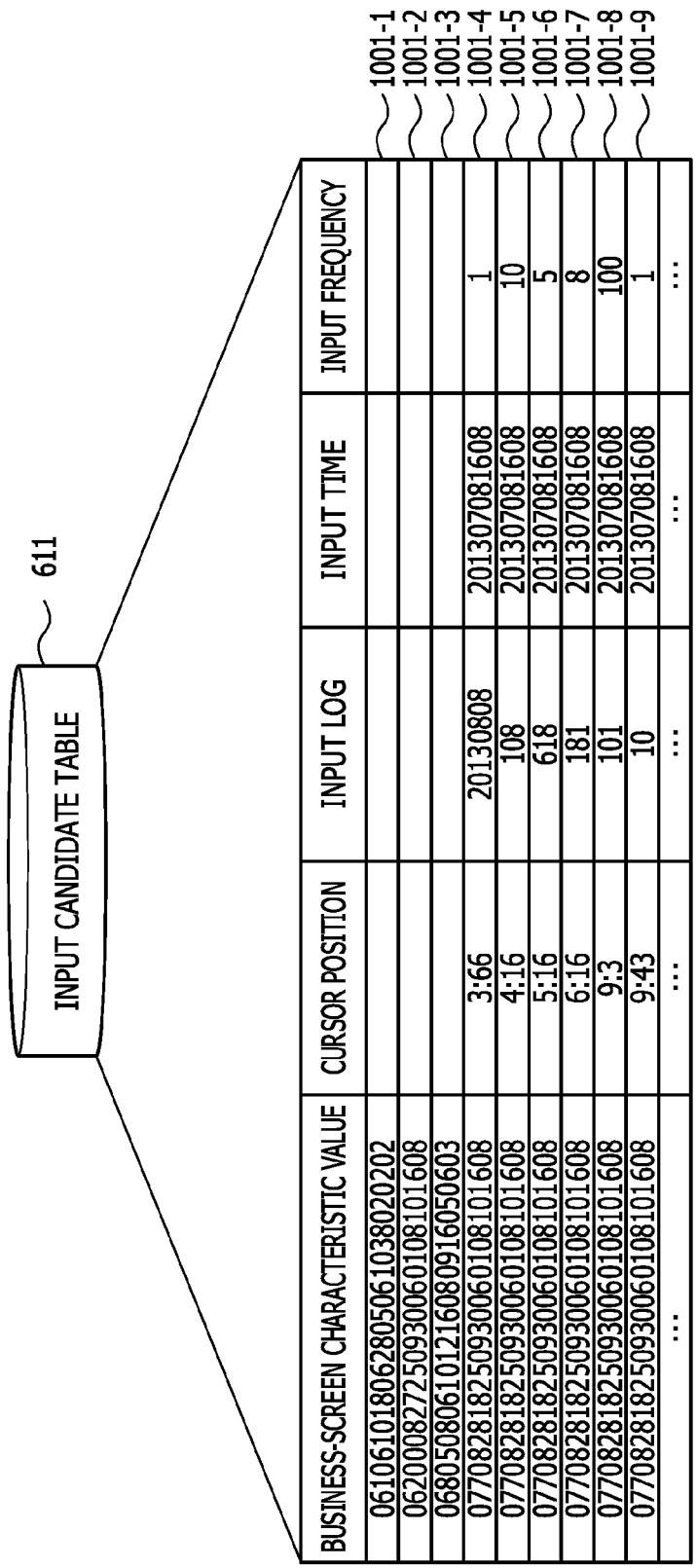
FIG. 10 is an explanatory diagram illustrating an example of storage content of an input candidate table.

FIG. 10 is an explanatory diagram illustrating an example of the storage content of the input candidate table 611. The input candidate table 611 illustrated in FIG. 10 stores records 1001-1 to 1001-9.

The input candidate table 611 includes a business-screen characteristic value field, a cursor position field, an input log field, an input time field, and an input frequency field. In the business-screen characteristic value field, a business-screen characteristic value is stored. In the cursor position field, a coordinate position of a cursor when a decided character string is inputted is stored. In the input log field, the decided character string is stored. In the input time field, the time when the decided character string is inputted is stored. In the input frequency field, the number of times the decided character string is inputted is stored.

For example, each of the records 1001-1 to 1001-3 indicates that, in a business screen identified with each of these records, an input character string is not inputted yet, or even though a character string is inputted and decided, the decided character string is invalid. Further, the record 1001-4 indicates information about a business screen having a characteristic value of "077082818250930060108101608". Furthermore, the record 1001-4 indicates that, in the screen having the business-screen characteristic value, a character string of "20130808" inputted at a cursor position of "3:66" is inputted for the first time at 16:08 on Jul. 8, 2013.

Figure 11:
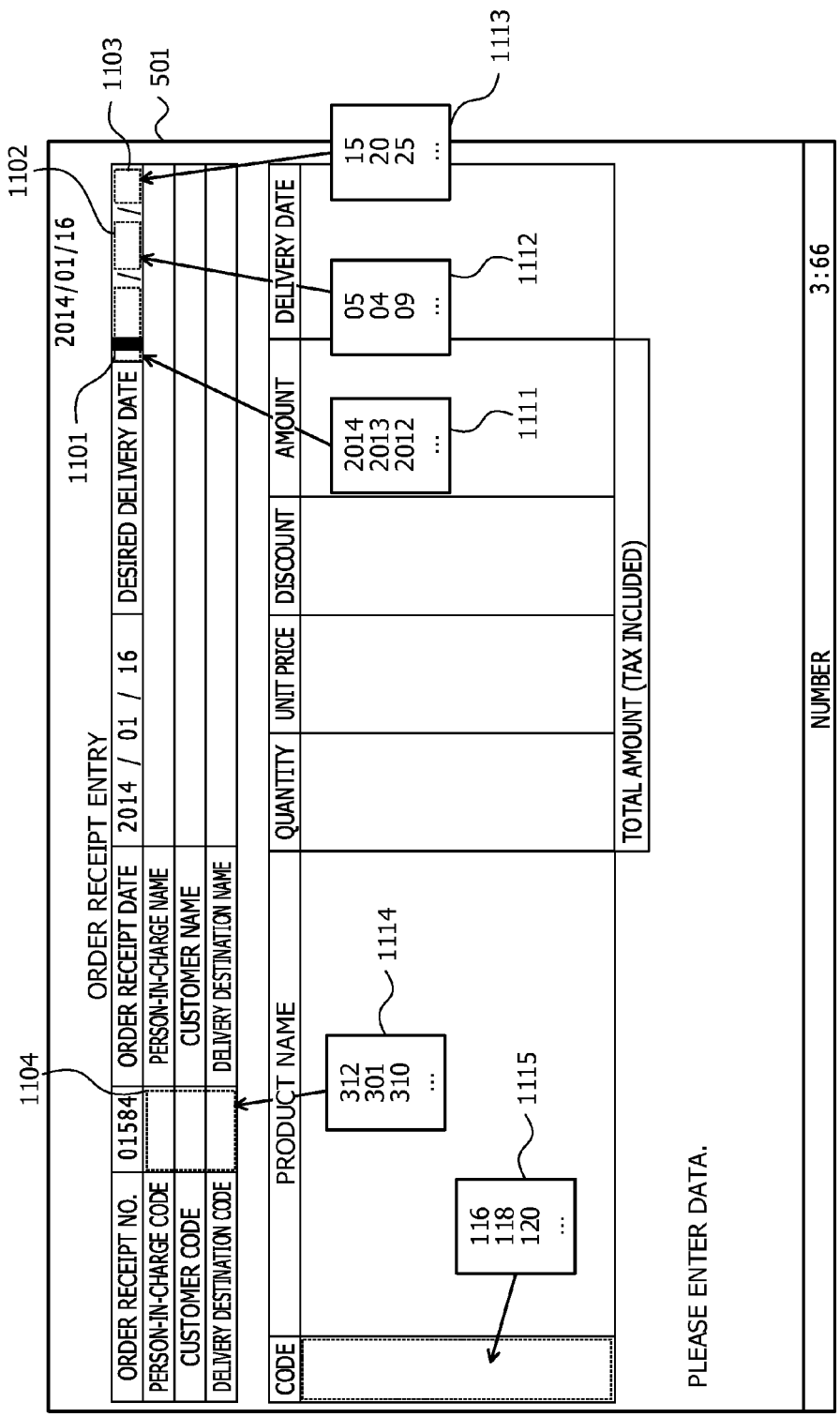
FIG. 11 is an explanatory diagram illustrating an example of an input-candidate character string.

FIG. 11 is an explanatory diagram illustrating an example of the input-candidate character string. For example, when a cursor is in a frame 1101, the client terminal 202 displays an input-candidate character string 1111. The input-candidate character string 1111 is a set of character strings each formed of a four-digit single-width number. Similarly, the client terminal 202 displays input-candidate character strings 1112 to 1115, when the cursor is in frames 1102 to 1105, respectively. The input-candidate character strings 1112 and 1113 are each a set of character strings each formed of a two-digit single-width number. The input-candidate character strings 1114 and 1115 are each a set of character strings each formed of a three-digit single-width number.

After an input-candidate character string is displayed, the client terminal 202 detects a press of an ENTER key as input processing, and transmits an input character string to the server 201 as a decided character string. For example, after transmitting the decided character string to the server 201, the client terminal 202 determines whether the decided character string is valid by using a response from the server 201. This example will be described below with reference to FIGS. 12A and 12B.

FIG. 12A is an explanatory diagram illustrating an example of determining validity of a decided character string (Part 1). FIG. 12B is also an explanatory diagram illustrating an example of determining validity of a decided character string (Part 2). In the example of FIG. 12A, after the decided character string is transmitted to the server 201, a response comes from the server 201, and a character string of "ready for entry of numbers only" is displayed in the status display region 504. In the example of FIG. 12B, after the decided character string is transmitted to the server 201, a response comes from the server 201, and no character is displayed in the status display region 504.

The client terminal 202 determines whether the decided character string is valid, by determining whether the character string displayed in the status display region 504 is an error message. In the example of FIG. 12A, the character string of "ready for entry of numbers only" corresponds to an error message and therefore, the client terminal 202 determines that the decided character string is invalid. On the other hand, in the example of FIG. 12B, no character is displayed in the status display region 504 and therefore, the client terminal 202 determines that the decided character string is valid. The client terminal 202 stores the decided character string determined to be valid, into the input candidate table 611, as an input log. A more specific storage example will be described using a flowchart illustrated in FIG. 23.

FIG. 13 is an explanatory diagram illustrating a screen example after completion of input. The order receipt entry screen 501 illustrated in FIG. 13 is in such a state that input in each of the input items for a person-in-charge code, a customer code, and a delivery destination code is completed. Further, in this state, input of identifications (IDs) in CODE, and input of product names, quantities, and unit prices corresponding to the IDs in CODE are also completed.

Next, processing to be performed by the business system 200 will be described with reference to FIGS. 14 to 23, by using flowcharts. The processing to be performed by the business system 200 includes preprocessing to be performed before start of a business service, and postprocessing to be performed during the business service. As the preprocessing, the client terminal 202 executes processing of creating an input candidate database to be used by Japanese input software, and input-candidate-table creation processing of creating the input candidate table 611. The processing of creating an input candidate database will not be described. The input-candidate-table creation processing will be described using FIG. 14. Further, business processing and a processing group called from the business processing will be described using FIGS. 15 to 23.

Figure 14:
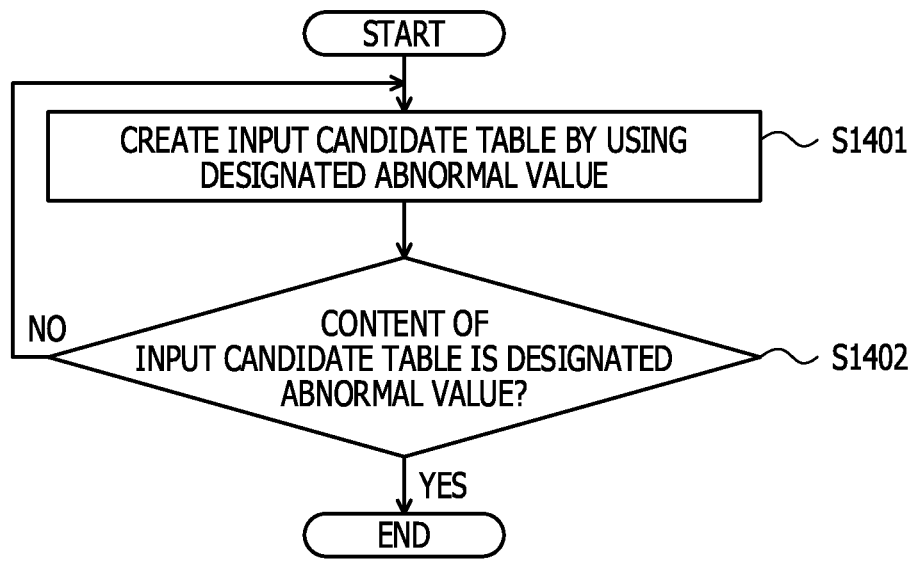
FIG. 14 is a flowchart illustrating an example of an input-candidate-table creation processing procedure.

FIG. 14 is a flowchart illustrating an example of an input-candidate-table creation processing procedure. The input-candidate-table creation processing is the processing of creating the input candidate table 611.

The client terminal 202 creates the input candidate table 611, by using a designated abnormal value (step S1401). The abnormal value is, for example, "AAAAAAAAAAAAAAAAAAAAAAAAA". Next, the client terminal 202 determines whether a content of the input candidate table 611 is the designated abnormal value (step S1402). When the content of the input candidate table 611 is not the designated abnormal value (step S1402: No), the client terminal 202 shifts to a process in step S1401. On the other hand, when the content of the input candidate table 611 is the designated abnormal value (step S1402: Yes), the client terminal 202 ends the input-candidate-table creation processing. Executing the input-candidate-table creation processing allows the client terminal 202 to prepare the input candidate table 611 before performing a business service.

Figure 15:
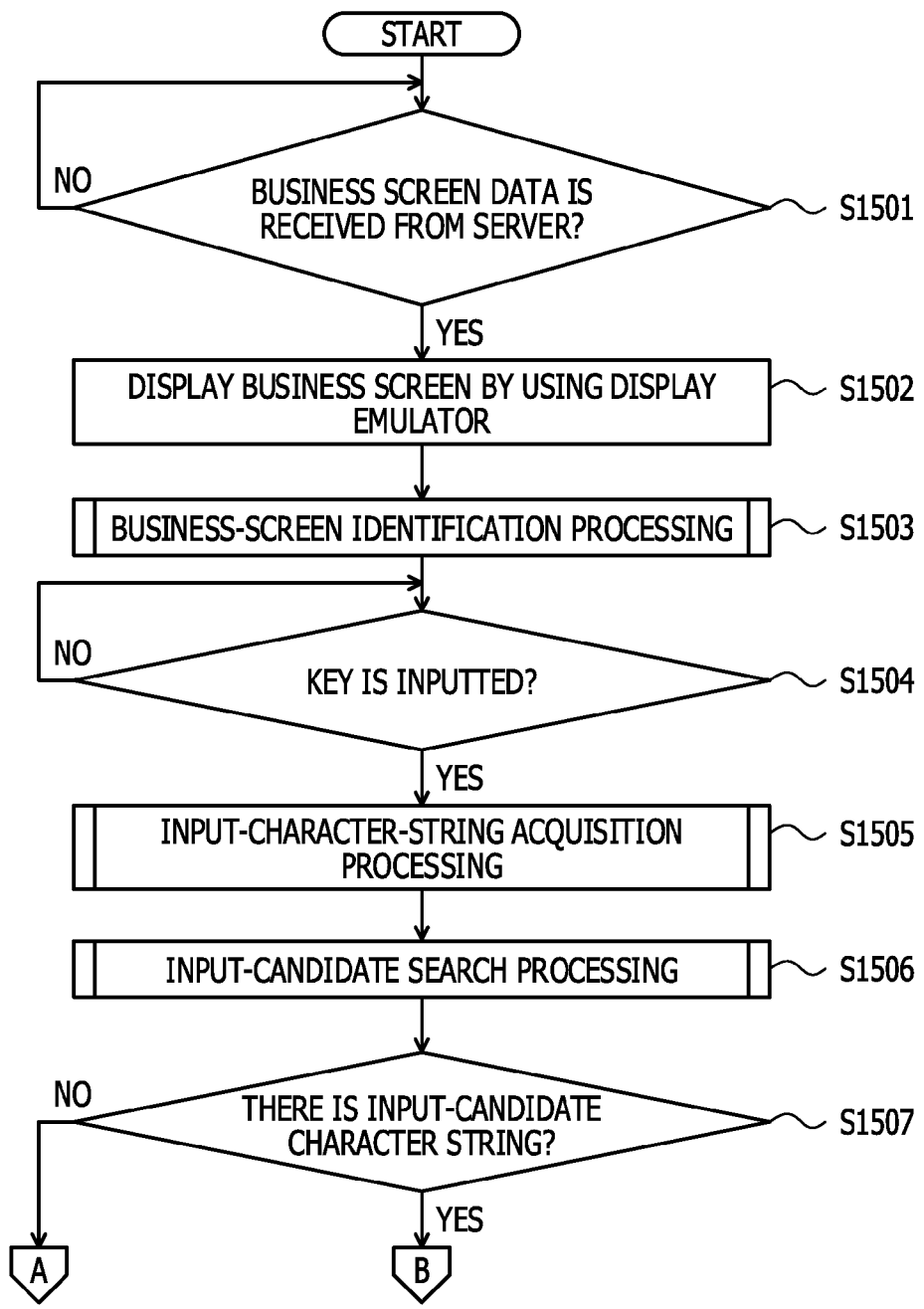
FIG. 15 is a flowchart illustrating an example of a business processing procedure (Part 1)
Figure 16:
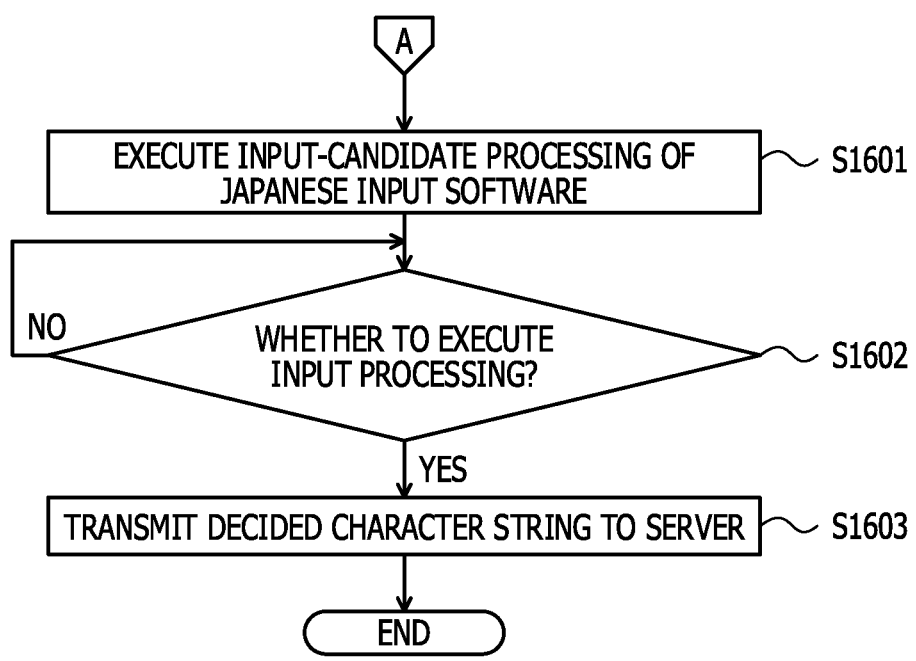
FIG. 16 is a flowchart illustrating the example of the business processing procedure (Part 2)
Figure 17:
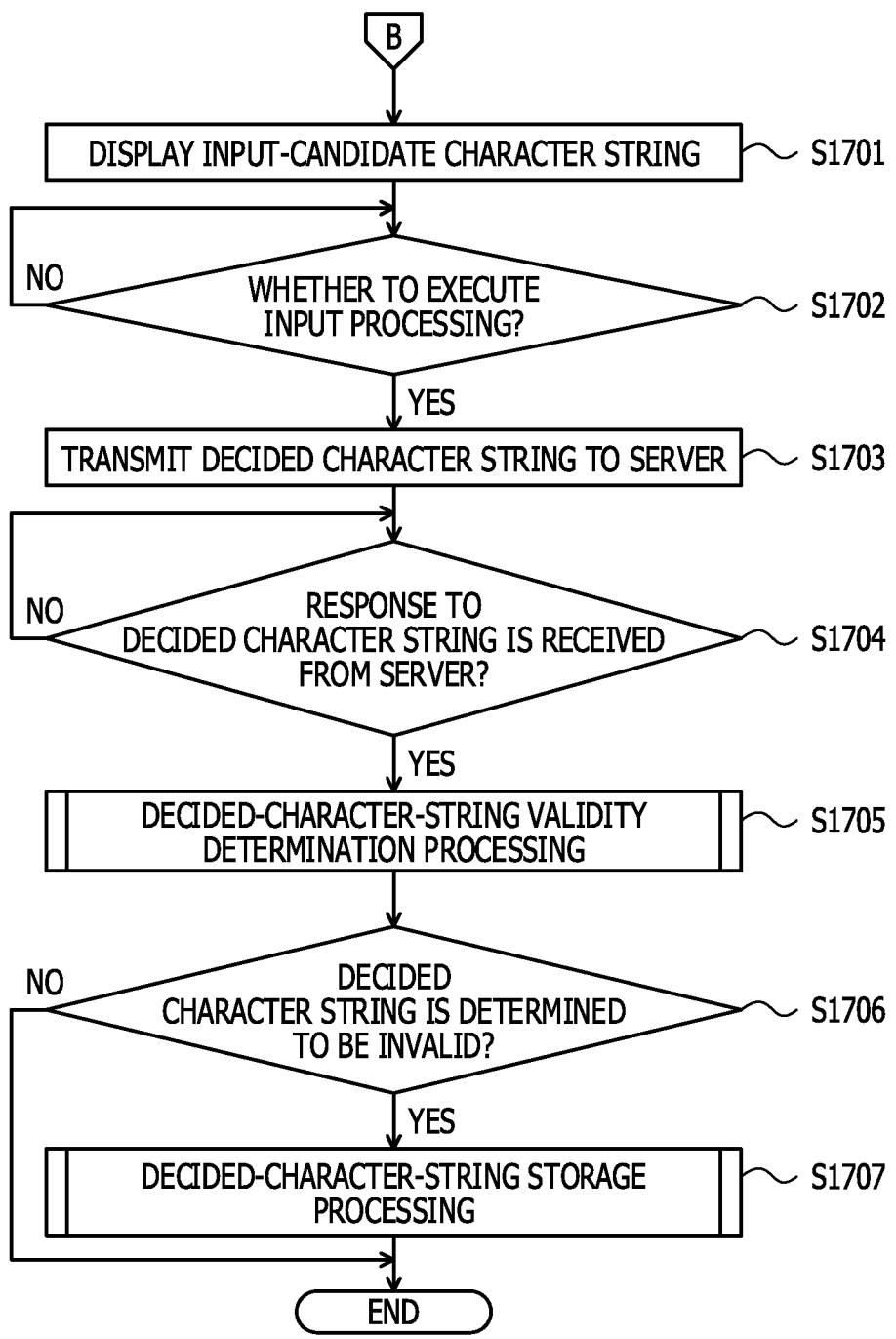
FIG. 17 is a flowchart illustrating the example of the business processing procedure (Part 3)

FIG. 15 is a flowchart illustrating an example of a business processing procedure (Part 1). FIG. 16 is another flowchart illustrating the example of the business processing procedure (Part 2). FIG. 17 is yet another flowchart illustrating the example of the business processing procedure (Part 3). The business processing is processing of executing a business service.

The client terminal 202 determines whether business screen data is received from the server 201 (step S1501). When the business screen data is not received from the server 201 (step S1501: No), the client terminal 202 executes the process in step S1501 again.

On the other hand, when the business screen data is received from the server 201 (step S1501: Yes), the client terminal 202 displays a business screen by using the display emulator (step S1502). Next, the client terminal 202 executes business-screen identification processing (step S1503). The business-screen identification processing will be described later with reference to FIGS. 18 and 19. The client terminal 202 then determines whether there is key input (step S1504). When there is no key input (step S1504: No), the client terminal 202 executes the process in step S1504 again.

On the other hand, when there is key input (step S1504: Yes), the client terminal 202 executes input-character-string acquisition processing (step S1505). The input-character-string acquisition processing will be described later with reference to FIG. 20. Next, the client terminal 202 executes input-candidate search processing (step S1506). The input-candidate search processing will be described later with reference to FIG. 21. The client terminal 202 then determines whether there is an input-candidate character string (step S1507).

When there is no input-candidate character string (step S1507: No), the client terminal 202 executes input candidate processing of Japanese input software (step S1601). Next, the client terminal 202 determines whether to execute input processing (step S1602). When the input processing is not to be executed (step S1602: No), the client terminal 202 executes the process in step S1602 again. When the input processing is to be executed (step S1602: Yes), the client terminal 202 transmits a decided character string decided by the Japanese input software, to the server 201 (step S1603). Upon completion of the process in step S1603, the client terminal 202 ends the business processing.

On the other hand, when there is an input-candidate character string (step S1507: Yes), the client terminal 202 displays the input-candidate character string (step S1701). Next, the client terminal 202 determines whether to execute input processing (step S1702). When the input processing is not to be executed (step S1702: No), the client terminal 202 executes the process in step S1702 again. On the other hand, when the input processing is to be executed (step S1702: Yes), the client terminal 202 transmits a decided character string decided by the input processing, to the server 201 (step S1703).

Next, the client terminal 202 determines whether a response corresponding to the decided character string is received from the server 201 (step S1704). When a response corresponding to the decided character string is not received from the server 201 (step S1704: No), the client terminal 202 executes the process in step S1704 again.

On the other hand, when a response corresponding to the decided character string is received from the server 201 (step S1704: Yes), the client terminal 202 executes decided-character-string validity determination processing (step S1705). The decided-character-string validity determination processing will be described later with reference to FIG. 22. Next, the client terminal 202 determines whether the decided character string is determined to be valid (step S1706). When the decided character string is determined to be valid (step S1706: Yes), the client terminal 202 executes decided-character-string storage processing (step S1707). The decided-character-string storage processing will be described later with reference to FIG. 23.

After completion of the process in step S1707 or when the decided character string is determined to be invalid (step S1706: No), the client terminal 202 ends the business processing. The client terminal 202 is allowed to use the business service provided by the server 201, by executing the business processing.

Figure 18:
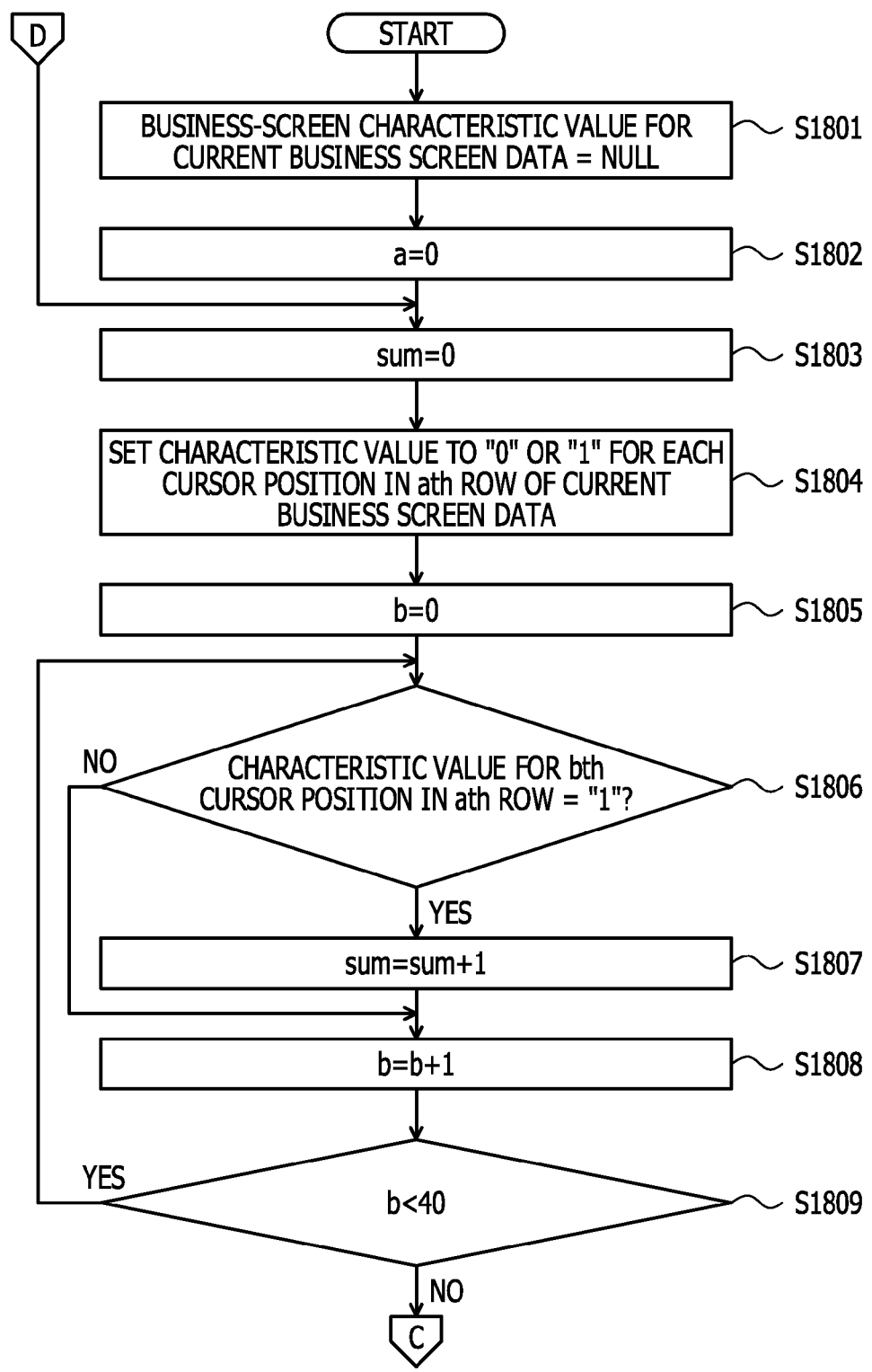
FIG. 18 is a flowchart illustrating an example of a business-screen identification processing procedure (Part 1)
Figure 19:
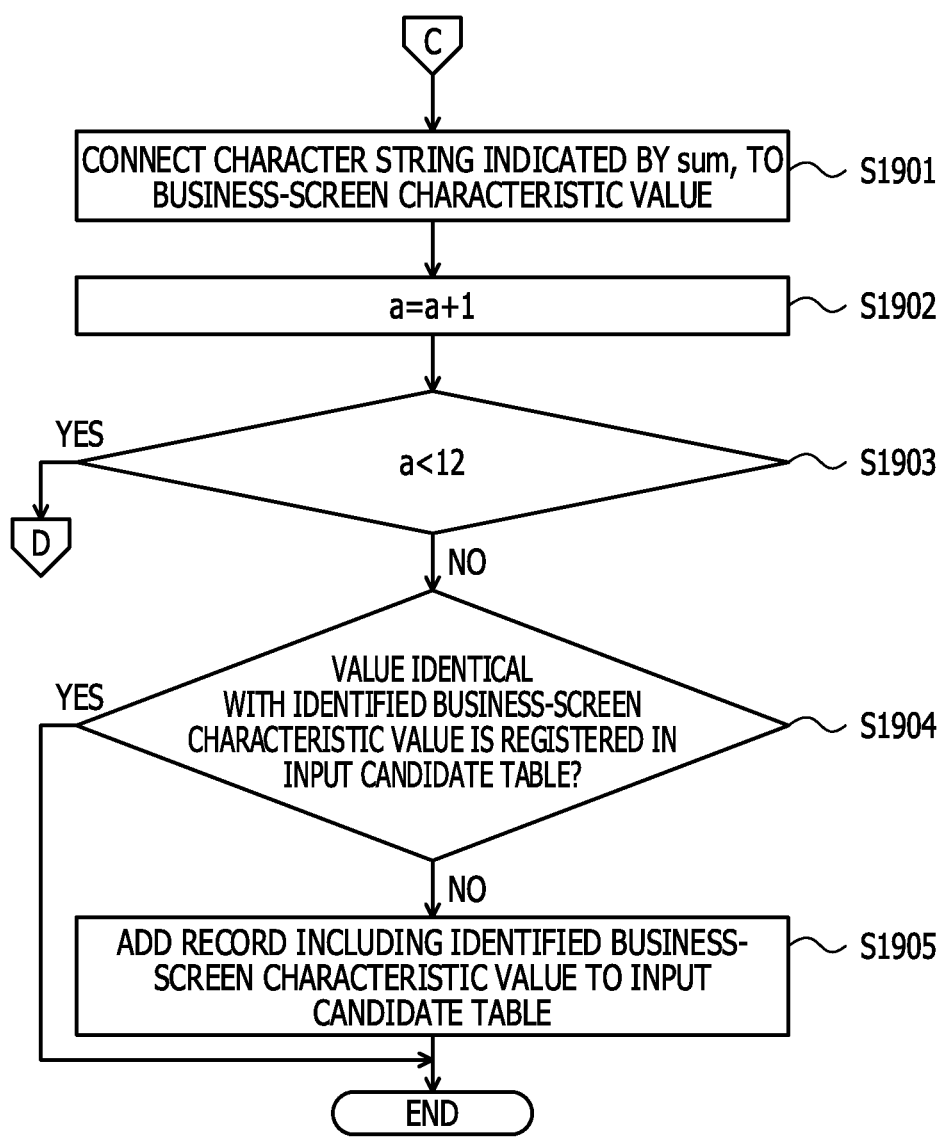
FIG. 19 is a flowchart illustrating the example of the business-screen identification processing procedure (Part 2)

FIG. 18 is a flowchart illustrating an example of the business-screen identification processing procedure (Part 1). FIG. 19 is another flowchart illustrating the example of the business-screen identification processing procedure (Part 2). The business-screen identification processing is processing of identifying a business screen.

The client terminal 202 sets a business-screen characteristic value for the current business screen data at NULL (step S1801). Next, the client terminal 202 sets "a" to "0" (step S1802). Further, the client terminal 202 sets "sum" to "0" (step S1803). Next, the client terminal 202 sets a characteristic value to "0" or "1", corresponding to each cursor position in an ath row of the current business screen data (step S1804). The client terminal 202 then sets "b" to "0" (step S1805).

Next, the client terminal 202 determines whether the characteristic value corresponding to a bth cursor position in the ath row is "1" (step S1806). When the characteristic value corresponding to the bth cursor position in the ath row is "1" (step S1806: Yes), the client terminal 202 increments the sum (step S1807).

Upon completion of the process in step S1807, or when the characteristic value corresponding to the bth cursor position in the ath row is "0" (step S1806: No), the client terminal 202 increments "b" (step S1808). Next, the client terminal 202 determines whether "b" is smaller than 40 (step S1809). When "b" is smaller than 40 (step S1809: Yes), the client terminal 202 shifts to the process in step S1806.

On the other hand, when "b" is 40 or greater (step S1809: No), the client terminal 202 connects a character string indicated by the sum, to the business-screen characteristic value (step S1901). Next, the client terminal 202 increments "a" (step S1902). The client terminal 202 then determines whether "a" is smaller than 12 (step S1903). When "a" is smaller than 12 (step S1903: Yes), the client terminal 202 shifts to the process in step S1803.

On the other hand, when "a" is 12 or greater (step S1903: No), the client terminal 202 determines whether a value identical with the identified business-screen characteristic value is registered in the input candidate table 611 (step S1904). When such a value is not registered in the input candidate table 611 (step S1904: No), the client terminal 202 adds a record including the identified business-screen characteristic value to the input candidate table 611 (step S1905).

Upon completion of the process in step S1905, or when such a value is registered in the input candidate table 611 (step S1904: Yes), the client terminal 202 ends the business-screen identification processing. The client terminal 202 is allowed to identify the business screen, by executing the business-screen identification processing.

Figure 20:
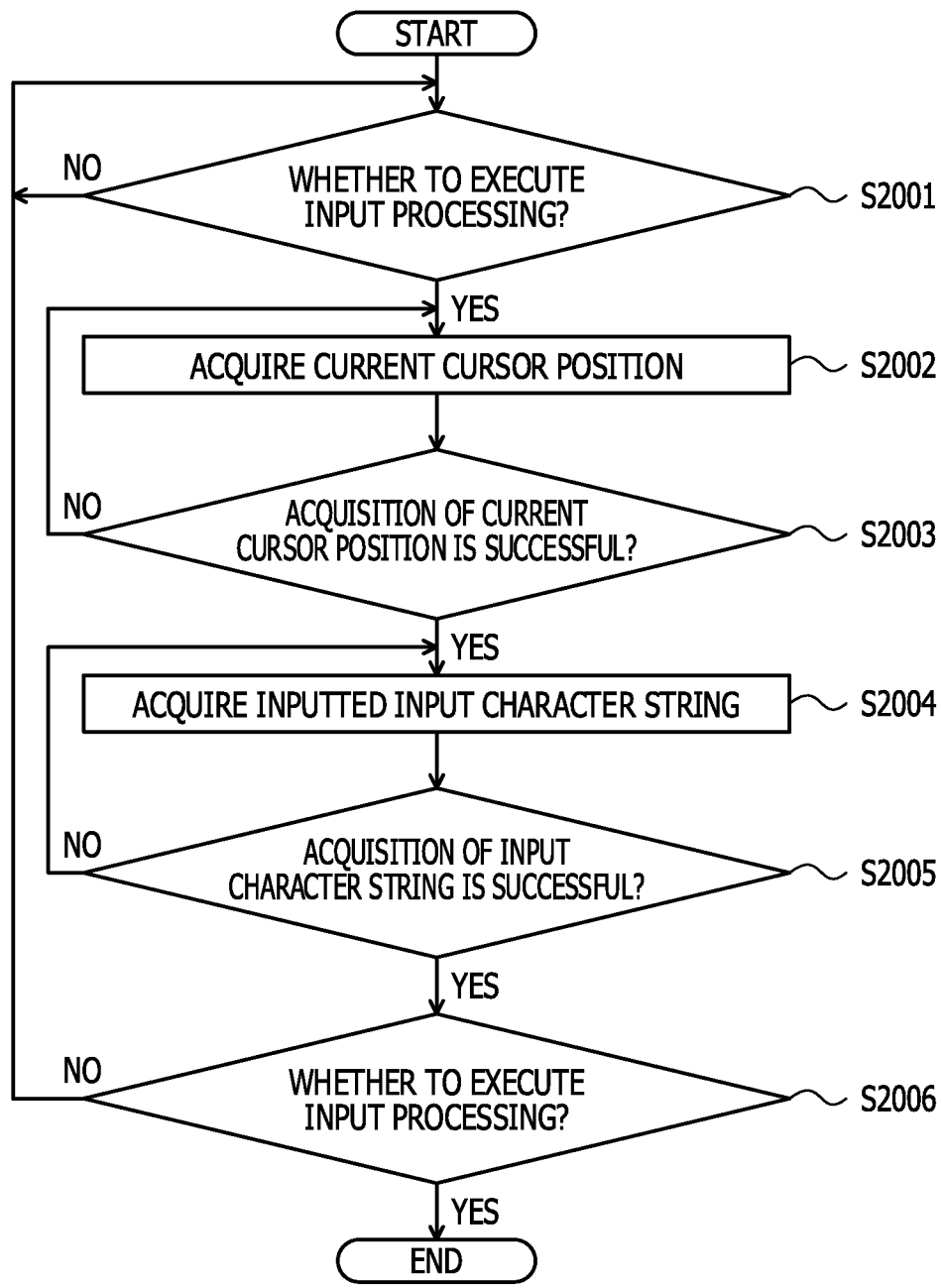
FIG. 20 is a flowchart illustrating an example of an input-character-string acquisition processing procedure.

FIG. 20 is a flowchart illustrating an example of the input-character-string acquisition processing procedure. The input-character-string acquisition processing is processing of acquiring an input character string. The client terminal 202 determines whether to execute input processing (step S2001). When the input processing is not to be executed (step S2001: No), the client terminal 202 executes the process in step S2001 again.

On the other hand, when the input processing is not to be executed (step S2001: Yes), the client terminal 202 acquires the current cursor position (step S2002). Next, the client terminal 202 determines whether acquisition of the current cursor position is successful (step S2003). When acquisition of the current cursor position is not successful (step S2003: No), the client terminal 202 shifts to the process in step S2002.

On the other hand, when acquisition of the current cursor position is successful (step S2003: Yes), the client terminal 202 acquires an input character string inputted (step S2004). Next, the client terminal 202 determines whether acquisition of the input character string is successful (step S2005). When acquisition of the input character string is not successful (step S2005: No), the client terminal 202 shifts to the process in step S2004.

On the other hand, when acquisition of the input character string is successful (step S2005: Yes), the client terminal 202 determines whether to execute input processing (step S2006). When the input processing is not to be executed (step S2006: No), the client terminal 202 shifts to the process in step S2001. On the other hand, when the input processing is to be executed (step S2006: Yes), the client terminal 202 ends the input-character-string acquisition processing. The client terminal 202 is allowed to acquire the input character string, by executing the input-character-string acquisition processing.

Figure 21:
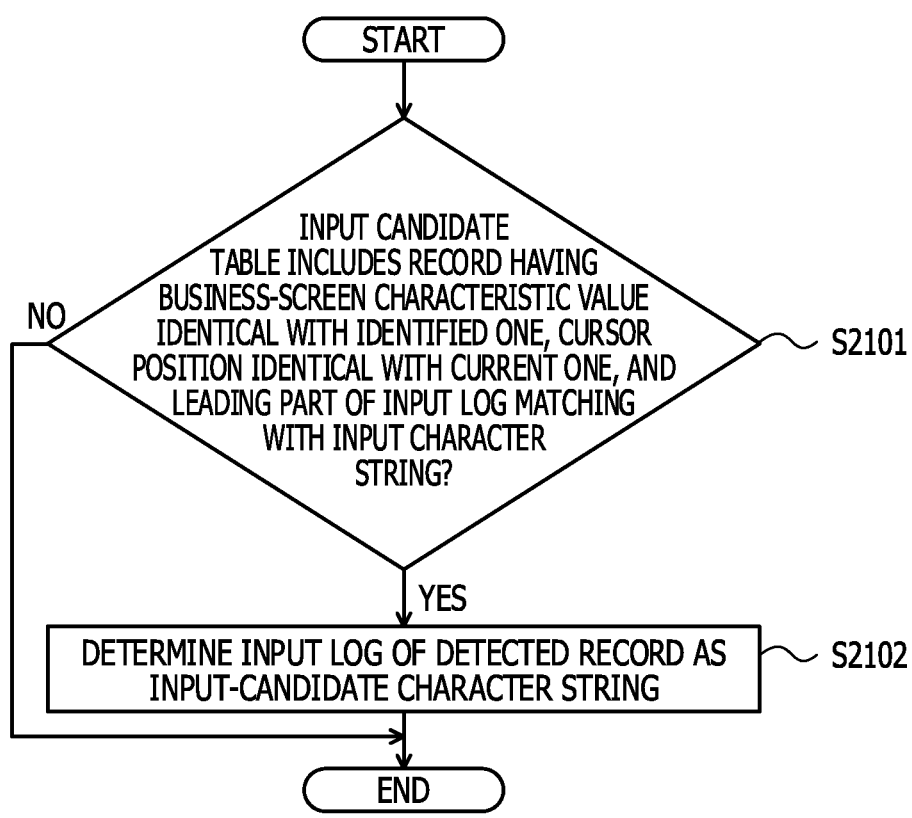
FIG. 21 is a flowchart illustrating an example of an input-candidate search processing procedure.

FIG. 21 is a flowchart illustrating an example of the input-candidate search processing procedure. The input-candidate search processing is processing of searching for an input-candidate character string related to an input character string.

The client terminal 202 determines whether the input candidate table 611 includes a record which has the business-screen characteristic value identical with the identified one, the cursor position identical with the current one, and a leading part of the input log matching with the input character string (step S2101). In the process in step S2101, for example, the client terminal 202 executes the process in step S2101 by issuing the following structure query language (SQL) code.

SELECT input candidate table 611.input log FROM input candidate table 611 WHERE input candidate table 611.business-screen characteristic value=identified business-screen characteristic value AND input candidate table 611.cursor position=current cursor position AND input candidate table 611.input log LIKE "input character string %"

Here, "%" in the SQL statement described above is an identifier that indicates any one of character strings each formed of one or more characters.

When there is a record in which the leading part of the input log matches with the input character string (step S2101: Yes), the client terminal 202 determines the input log of the detected record as an input-candidate character string (step S2102). When there are two or more matching records, the client terminal 202 may display the input logs of these records in the order in which these records are detected in step S2101.

Upon completion of the process in step S2102, or when there is no record in which a leading part of an input log matches with the input character string (step S2101: No), the client terminal 202 ends the input-candidate search processing. The client terminal 202 is allowed to detect the input-candidate character string related to the input character string, by executing the input-candidate search processing.

Further, in the process in step S2101, the client terminal 202 may use the input time field or the input frequency field of the input candidate table 611.

For instance, in an example of using the input time field, when detecting two or more records in the process in step S2101, the client terminal 202 may preferentially display the record having the input time close to the current input time. Further, in an example of using the input frequency field, when detecting two or more records in the process in step S2101, the client terminal 202 may preferentially display the record in which an input frequency is higher. Here, preferentially displaying the record refers to displaying the record at a position easily selectable by the user of the client terminal 202. For example, the client terminal 202 may preferentially display the record having the input time close to the current input time, in the first position.

For instance, in the example of using the input time field, the client terminal 202 preferentially displays the record of the same month as the month of the current input time, or the record of the same quarter as the quarter of the current input time, among the detected records.

Figure 22:
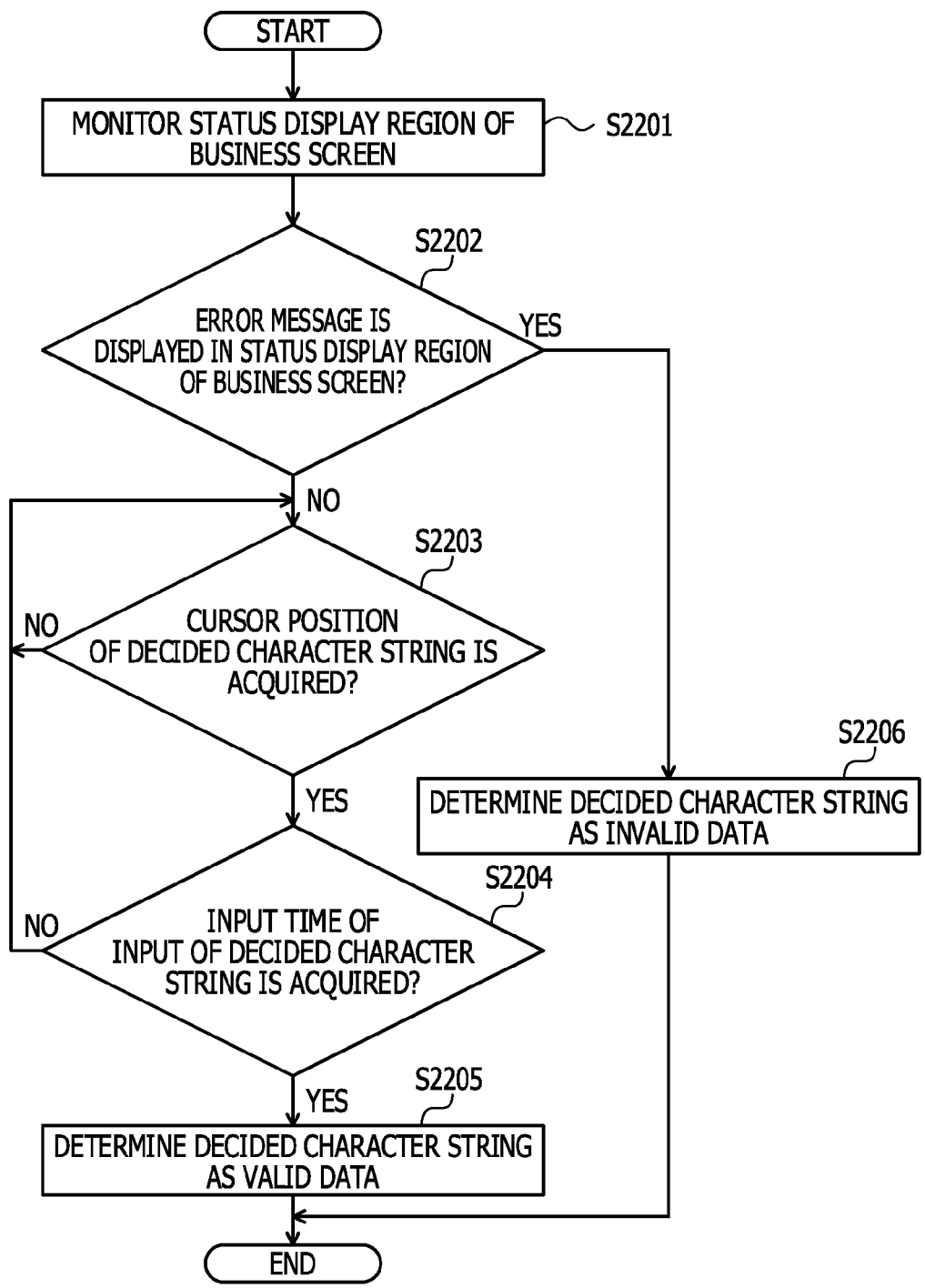
FIG. 22 is a flowchart illustrating an example of a decided-character-string validity determination processing procedure.

FIG. 22 is a flowchart illustrating an example of a decided-character-string validity determination processing procedure. The decided-character-string validity determination processing is processing of determining whether the decided character string is valid.

The client terminal 202 monitors a status display region of a business screen (step S2201). Next, the client terminal 202 determines whether an error message is displayed in the status display region of the business screen (step S2202). When no error message is displayed in the status display region of the business screen (step S2202: No), the client terminal 202 determines whether the cursor position of the decided character string is acquired (step S2203). When the cursor position of the decided character string is acquired (step S2203: Yes), the client terminal 202 determines whether the input time of the input of the decided character string is acquired (step S2204).

When the cursor position of the decided character string is not acquired (step S2203: No), or when the input time of the input of the decided character string is not acquired (step S2204: No), the client terminal 202 shifts to the process in step S2203. Such a case of resulting in No in step S2203 or No in step S2204 may be, for example, a case where a thread executing the decided-character-string validity determination processing sends a query about the cursor position of the decided character string or the input time of the input of the decided character string, to the display emulator, and there is no response to this query. When there is no response, the thread executing the decided-character-string validity determination processing sends the query again after a lapse of a predetermined time.

When the input time of the input of the decided character string is acquired (step S2204: Yes), the client terminal 202 determines the decided character string as valid data (step S2205). On the other hand, when an error message is displayed in the status display region of the business screen (step S2202: Yes), the client terminal 202 determines the decided character string as invalid data (step S2206). After completion of the process in step S2205 or the process in step S2206, the client terminal 202 ends the decided-character-string validity determination processing. The client terminal 202 is allowed to determine whether the decided character string is valid, by executing the decided-character-string validity determination processing.

Figure 23:
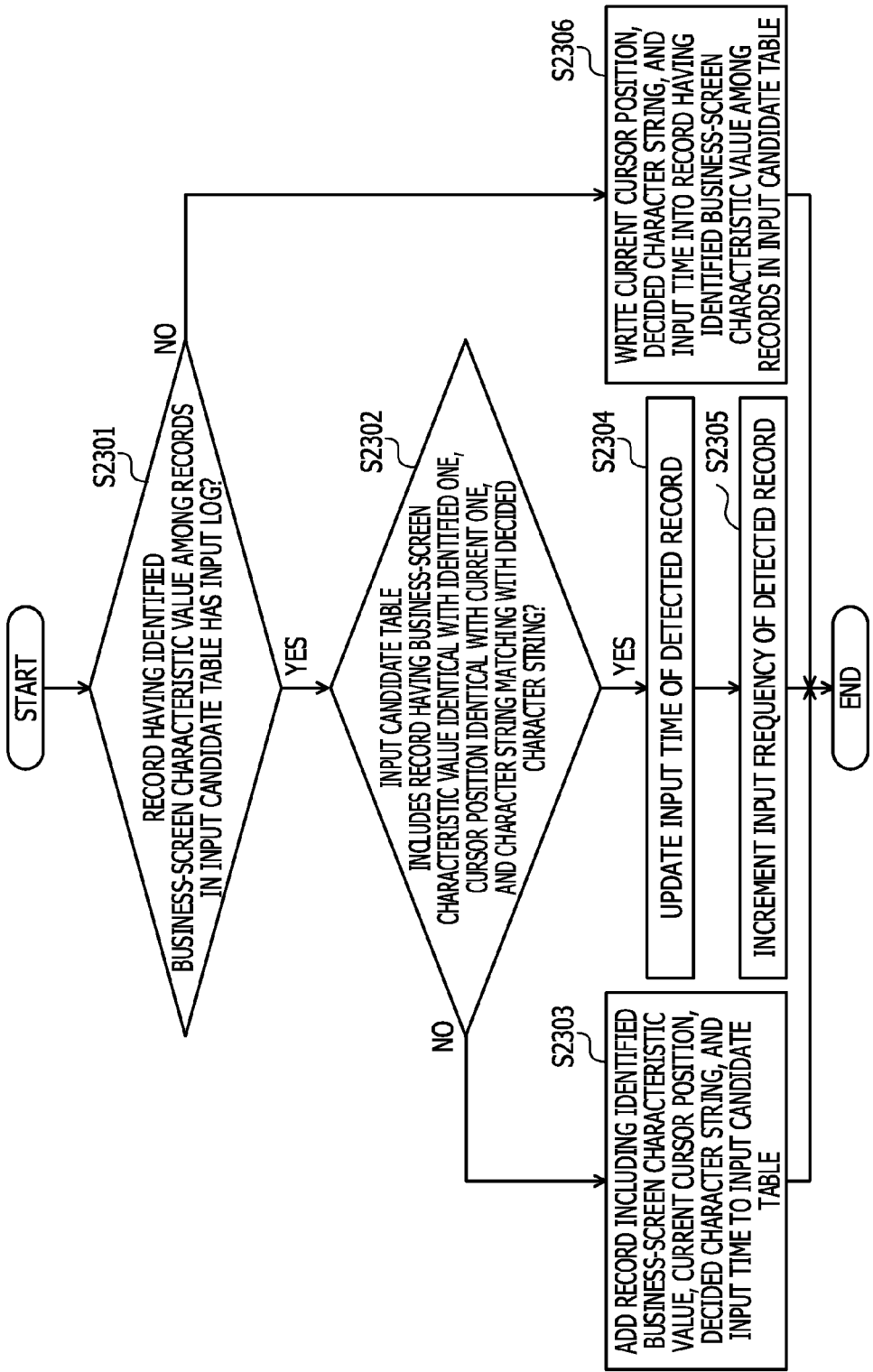
FIG. 23 is a flowchart illustrating an example of a decided-character-string storage processing procedure.

FIG. 23 is a flowchart illustrating an example of a decided-character-string storage processing procedure. The decided-character-string storage processing is processing of storing the decided character string into the input candidate table 611.

The client terminal 202 determines whether a record having the identified business-screen characteristic value among records in the input candidate table 611 has an input log (step S2301). For example, the client terminal 202 executes the process in step S2301, by issuing the following SQL code.

SELECT input candidate table 611.input log FROM input candidate table 611 WHERE input candidate table 611.business-screen characteristic value=identified business-screen characteristic value When the record has an input log (step S2301: Yes), the client terminal 202 subsequently determines whether the input candidate table 611 includes a record having the business-screen characteristic value identical with the identified one, the cursor position identical with the current one, and the character string matching with the decided character string (step S2302). For example, the client terminal 202 executes the process in step S2302 by issuing the following SQL code.

SELECT input candidate table 611.input log FROM input candidate table 611 WHERE input candidate table 611.business-screen characteristic value=identified business-screen characteristic value AND input candidate table 611.cursor position=current cursor position AND input candidate table 611.input log=decided character string When there is no record having a character string matching with the decided character string (step S2302: No), the client terminal 202 adds a record including the identified business-screen characteristic value, the current cursor position, the decided character string, and the input time to the input candidate table 611 (step S2303).

On the other hand, when there is a record having the character string matching with the decided character string (step S2302: Yes), the client terminal 202 updates the input time of the detected record, with the input time of the input of the decided character string (step S2304). Next, the client terminal 202 increments the input frequency of the detected record (step S2305).

When the record has no input log (step S2301: No), the client terminal 202 writes the current cursor position, the decided character string, and the input time, into the record having the identified business-screen characteristic value among records in the input candidate table 611 (step S2306).

Upon completion of the process in any of step S2303, step S2305, and step S2306, the client terminal 202 ends the decided-character-string storage processing. The client terminal 202 is allowed to store the decided character string in the input candidate table 611, by executing the decided-character-string storage processing.

As described above, according to the client terminal 202, a character string corresponding to the operation position on the screen is searched for from the input candidate table 611 where the character string decided to be inputted on the screen and the coordinate position at which the character string is inputted are associated with each other. The client terminal 202 is allowed to display the input log of the character-input region provided below the operation position on the screen, and is therefore allowed to support the character input operation of the user. For example, the user of the client terminal 202 is allowed to reduce an operation amount for character input by the user, by selecting the displayed input-candidate character string. In addition, for example, the user of the client terminal 202 is allowed to know an example of a character string inputted in the character-input region, as a clue to a character string to be inputted in the character-input region, by viewing the displayed input-candidate character string.

Moreover, according to the client terminal 202, when the input character string is determined to be valid, a character string indicated by the input character string and a coordinate position on the business screen at which the input character string is inputted may be registered in the input candidate table 611, such that the character string and the coordinate position are associated with each other. Therefore, a character string valid for the business screen is stored and a character string invalid for the business screen is not stored, in the input candidate table 611, and thus, the client terminal 202 is allowed to increase accuracy of character string completion.

In addition, according to the client terminal 202, a business-screen characteristic value may be generated based on information about a business screen, and a character string corresponding to the generated business-screen characteristic value and an operation position may be searched for from the input candidate table 611. When business screens have similar characteristic values, input character strings that the user is about to input are likely to be similar as well. Therefore, even if the business screen is a screen in which data is inputted by the user for the first time, the client terminal 202 is allowed to perform the input completion when there is a business screen having a characteristic value similar to that of this business screen.

Further, according to the client terminal 202, corresponding to a division region formed by dividing a business screen, a characteristic value of the division region may be determined based a pixel value of the business screen, and a business-screen characteristic value may be generated based on the determined characteristic value of the division region. This allows the client terminal 202 to generate a business-screen characteristic value, even if screen data of a business screen from the server 201 is encrypted so that acquisition of the screen data is not allowed.

In addition, according to the client terminal 202, a business-screen characteristic value may be generated based on the coordinate position of a ruled line in a business screen or the coordinate position of a character-input region in the business screen. The coordinate position of the ruled line in the business screen and the coordinate position of the character-input region in the business screen may be obtained only by extracting these positions from screen data of the business screen from the server 201. Therefore, the client terminal 202 is allowed to generate the business-screen characteristic value, with a throughput lower than that in generation of a business-screen characteristic value based on a pixel value of the business screen.

Moreover, according to the client terminal 202, the input candidate table 611 may be searched for a character string, which corresponds to a coordinate position on a business screen at which any character of an input character string being inputted on the business screen is inputted. The client terminal 202 may search the input candidate table 611 only when any character is inputted. Therefore, the client terminal 202 is allowed to reduce an amount of burden on the input completion, as compared with searching the input candidate table 611 each time input from the keyboard 408 or the mouse 409 occurs.

In addition, according to the client terminal 202, the input candidate table 61 may be searched for a character string which corresponds to any character being inputted on a business screen, and to a coordinate position on a business screen at which this any character is inputted. This allows the client terminal 202 to narrow down an input-candidate character string more accurately, as compared with searching for a character string corresponding to any character from character strings registered beforehand. Therefore, an increase in accuracy of character string completion is allowed.

Further, according to the business system 200, a character string corresponding to an operation position may be retrieved by transmitting the operation position to the server 201, and receiving a search result indicating the character string corresponding to the operation position in the input candidate table 611, from the server 201. Therefore, when a certain user performs character input, the business system 200 may be allowed to determine an input candidate by using a character string whose input is decided by another user. Accordingly, an increase in accuracy of character string completion is allowed.

Furthermore, the client terminal 202 is allowed to introduce the input completion to a display emulator having no function of input completion. In addition, the client terminal 202 is allowed to display an optimum candidate for each use situation and each input position. Moreover, the client terminal 202 is allowed to reduce the number of key inputs by the user of the client terminal 202, by displaying an optimum candidate. Further, the client terminal 202 is allowed to reduce the frequency of occurrence of an input error made by the user of the client terminal 202, by displaying an optimum candidate.

In addition, the business system 200 is allowed to introduce the input completion, without changing a business program running on the server 201. Moreover, when the two or more client terminals 202 are provided, the business system 200 may introduce the input completion to each of all the client terminals 202, or may introduce the input completion to some of the client terminals 202.

For instance, in an example of introducing the input completion to some of the client terminals 202, the input completion may not be introduced to the client terminal 202 used by an unspecified number of users, among the two or more client terminals 202. This allows the business system 200 to inhibit an unspecified number of people from viewing an input-candidate character string displayed by the input completion, while enabling the input completion in some of the client terminals 202 to which the input completion is introduced.

The input support method described in the present embodiment is achievable by executing a program prepared beforehand, in a computer such as a personal computer and a workstation. The present input support program is stored in a computer-readable recording medium such as a hard disk, a flexible disk, a compact disc-read only memory (CD-ROM), and a digital versatile disk (DVD), and read from the recording medium by the computer to be executed. Further, the present input support program may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An input support apparatus comprising:
   a memory configured to store association information including coordinates and a character string associated with the coordinates, the coordinates corresponding to a location at which the associated character string is to be located on a screen; and
   a processor configured to execute a process comprising:
     acquiring a current cursor position on the screen and an input character string;
     searching the association information based at least on coordinates of the current cursor position on the screen and the input character string, and
   outputting a character string from the association information, the output character string matching the input character string and having associated coordinates that match the coordinates of the current cursor position.

2. The input support apparatus according to claim 1, wherein the process further comprising:

acquiring information indicating whether the input character string is valid; and adding, when determining that the input character string is valid based on the acquired information, the input character string and coordinates at which the input character string is inputted on the screen, to the association information by associating the input character string and the coordinates at which the input character string is inputted on the screen with each other.

3. The input support apparatus according to claim 1, wherein the association information includes information in which a value characterizing the screen, the input character string, and coordinates at which the input character string is inputted on the screen are associated with one another, and the process further comprising:

generating a value characterizing the screen for input operation, based on screen information of the screen for input operation; and searching the association information for a character string that corresponds to the generated value characterizing the screen for input operation and to the coordinates of the operation position.

4. The input support apparatus according to claim 3, wherein the process further comprising:

determining, for a division region formed by dividing the screen for input operation, a value characterizing the division region based on a value of each pixel of the screen for input operation; and generating a value characterizing the screen for input operation, based on the determined value characterizing the division region.

5. The input support apparatus according to claim 3, wherein the process comprising generating a value characterizing the screen for input operation based on coordinates of a ruled line on the screen for input operation, or coordinates of a character-input region on the screen for input operation.

6. The input support apparatus according to claim 1, wherein the coordinates of the current cursor position are coordinates at which any character in the input character string is inputted on the screen for input operation while the input character is being inputted on the screen.

7. The input support apparatus according to claim 6, wherein the process comprising searching the association information for a character string that corresponds to the any character and the coordinates at which the any character is inputted on the screen.

8. An information processing system comprising:

the input support apparatus according to claim 1; and an information processing apparatus configured to send screen information of the screen for input operation to the input support apparatus.

9. The information system according to claim 8, wherein the input support apparatus retrieves a character string corresponding to the current cursor position by transmitting information of the current cursor position to the information processing apparatus, and by receiving a search result indicating a character string corresponding to the current cursor position in the association information, from the information processing apparatus.

10. A method comprising:

storing in a memory association information including coordinates and a character string associated with the coordinates, the coordinates corresponding to a location at which the associated character string is to be located on a screen;

acquiring a current cursor position on the screen and an input character string;

searching, by a processor, the association information based on at least coordinates of the current cursor position on the screen and the input character string; and outputting a character string from the association information, the output character string matching the input character string and having associated coordinates that match the coordinates of the current cursor position.

11. The method according to claim 10, wherein the method further comprising:

acquiring information indicating whether the input character string is valid; and adding, when determining that the input character string is valid based on the acquired information, the input character string and coordinates at which the input character string is inputted on the screen, to the association information by associating the input character string and the coordinates at which the input character string is inputted on the screen with each other.

12. The method according to claim 10, wherein the association information includes information in which a value characterizing the screen, the input character string, and coordinates at which the input character string is inputted on the screen are associated with one another, and the method further comprising:

generating a value characterizing the screen for input operation, based on screen information of the screen for input operation; and searching, by the processor, the association information for a character string that corresponds to the generated value characterizing the screen for input operation and to the coordinates of the operation position.

13. The method according to claim 10, wherein the method further comprising:

determining for a division region formed by dividing the screen for input operation, a value characterizing the division region based on a value of each pixel of the screen for input operation; and generating a value characterizing the screen for input operation, based on the determined value characterizing the division region.

14. The method according to claim 12, wherein the method further comprising generating a value characterizing the screen for input operation based on coordinates of a ruled line on the screen for input operation, or coordinates of a character-input region on the screen for input operation.

15. The method according to claim 10, wherein the coordinates of the current cursor position are coordinates at which any character in the input character string is inputted on the screen for input operation while the input character is being inputted on the screen.

16. The method according to claim 15, wherein the method further comprising searching, by the processor, the association information for a character string that corresponds to the any character and the coordinates at which the any character is inputted on the screen.

17. A non-transitory computer-readable medium storing therein a program to execute a process, the process comprising:
- storing in a memory association information including coordinates and a character string associated with the coordinates, the coordinates corresponding to a location at which the associated character string is to be located on a screen;
- acquiring a current cursor position on the screen and an input character string;
- searching the association information based on at least coordinates of the current cursor position on the screen and the input character string; and
- outputting a character string from the association information, the output character string matching the input character string and having associated coordinates that match the coordinates of the current cursor position.

* * * * *